(12) United States Patent
Bi et al.

(10) Patent No.: US 9,049,423 B2
(45) Date of Patent: Jun. 2, 2015

(54) ZERO DISPARITY PLANE FOR FEEDBACK-BASED THREE-DIMENSIONAL VIDEO

(75) Inventors: Ning Bi, San Diego, CA (US); Xuerui Zhang, San Diego, CA (US); Yingyong Qi, San Diego, CA (US); Chienchung Chang, Rancho Santa Fe, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 311 days.

(21) Appl. No.: 12/958,107

(22) Filed: Dec. 1, 2010

(65) Prior Publication Data

US 2012/0140038 A1 Jun. 7, 2012

(51) Int. Cl.
*H04N 13/02* (2006.01)
*H04N 13/00* (2006.01)
*G06T 7/40* (2006.01)
*G06T 5/40* (2006.01)
*G06K 9/46* (2006.01)
*G06K 9/62* (2006.01)

(52) U.S. Cl.
CPC .. *H04N 13/0022* (2013.01); *G06T 2207/20228* (2013.01); *H04N 13/0271* (2013.01); *G06T 5/40* (2013.01); *G06K 9/4642* (2013.01); *G06T 7/403* (2013.01); *G06K 9/6212* (2013.01); *H04N 2013/0081* (2013.01)

(58) Field of Classification Search
CPC combination set(s) only.
See application file for complete search history.

(56) References Cited

U.S. PATENT DOCUMENTS

| | | | |
|---|---|---|---|
| 5,661,518 A | 8/1997 | Palm et al. | |
| 5,937,079 A * | 8/1999 | Franke | 382/103 |
| 6,226,396 B1 | 5/2001 | Marugame | |
| 6,414,709 B1 | 7/2002 | Palm et al. | |
| 6,862,364 B1 * | 3/2005 | Berestov | 382/132 |
| 7,440,004 B2 | 10/2008 | Siegel et al. | |
| 8,326,084 B1 * | 12/2012 | Marrion et al. | 382/285 |
| 8,488,870 B2 * | 7/2013 | Martinez-Bauza et al. | 382/154 |
| 2004/0004616 A1 | 1/2004 | Konya et al. | |

(Continued)

FOREIGN PATENT DOCUMENTS

| | | |
|---|---|---|
| CN | 1956555 A | 5/2007 |
| JP | H08329110 A | 12/1996 |

(Continued)

OTHER PUBLICATIONS

Wang C., et al., "Region-Based Stereo Panorama Disparity Adjusting," IEEE, 8th Workshop on Multimedia Signal Processing, Oct. 3-6, 2006, pp. 186-191.

(Continued)

*Primary Examiner* — Dave Czekaj
*Assistant Examiner* — Tyler W Sullivan
(74) *Attorney, Agent, or Firm* — Brent A. Boyd

(57) ABSTRACT

The techniques of this disclosure are directed to the feedback-based stereoscopic display of three-dimensional images, such as may be used for video telephony (VT) and human-machine interface (HMI) application. According to one example, a region of interest (ROI) of stereoscopically captured images may be automatically determined based on determining disparity for at least one pixel of the captured images are described herein. According to another example, a zero disparity plane (ZDP) for the presentation of a 3D representation of stereoscopically captured images may be determined based on an identified ROI. According to this example, the ROI may be automatically identified, or identified based on receipt of user input identifying the ROI.

40 Claims, 14 Drawing Sheets

(56) References Cited

U.S. PATENT DOCUMENTS

| | | | |
|---|---|---|---|
| 2004/0208357 A1* | 10/2004 | Tokuhashi et al. | 382/154 |
| 2005/0180602 A1* | 8/2005 | Yang et al. | 382/103 |
| 2006/0050338 A1 | 3/2006 | Hattori | |
| 2006/0083421 A1 | 4/2006 | Weiguo et al. | |
| 2006/0125921 A1* | 6/2006 | Foote | 348/159 |
| 2007/0081716 A1* | 4/2007 | Ha et al. | 382/154 |
| 2007/0248260 A1* | 10/2007 | Pockett | 382/154 |
| 2007/0255480 A1* | 11/2007 | Southall et al. | 701/96 |
| 2008/0112616 A1* | 5/2008 | Koo et al. | 382/171 |
| 2009/0073170 A1* | 3/2009 | Berretty et al. | 345/427 |
| 2009/0295790 A1* | 12/2009 | Pockett | 345/419 |
| 2010/0067741 A1 | 3/2010 | Stolkin et al. | |
| 2010/0289882 A1 | 11/2010 | Ohta | |
| 2011/0018976 A1* | 1/2011 | Park | 348/51 |
| 2011/0019989 A1* | 1/2011 | Tanaka | 396/104 |
| 2011/0080466 A1* | 4/2011 | Kask et al. | 348/43 |
| 2011/0182477 A1* | 7/2011 | Tamrakar et al. | 382/110 |
| 2011/0194756 A1* | 8/2011 | Morifuji et al. | 382/154 |
| 2011/0199459 A1* | 8/2011 | Barenbrug et al. | 348/43 |
| 2011/0292178 A1* | 12/2011 | Goma et al. | 348/46 |
| 2011/0316985 A1* | 12/2011 | Ishikawa et al. | 348/51 |
| 2012/0120200 A1* | 5/2012 | Newton et al. | 348/46 |
| 2014/0362187 A1* | 12/2014 | Hayashi | 348/46 |

FOREIGN PATENT DOCUMENTS

| | | |
|---|---|---|
| JP | 2003209858 A | 7/2003 |
| JP | 2004040445 A | 2/2004 |
| JP | 2006114023 A | 4/2006 |
| JP | 2006221603 A | 8/2006 |
| JP | 2010154422 A | 7/2010 |
| JP | 2010268109 A | 11/2010 |
| JP | 2011029905 A | 2/2011 |
| KR | 20070040645 A | 4/2007 |
| WO | WO2005060271 A1 | 6/2005 |

OTHER PUBLICATIONS

International Search Report and Written Opinion—PCT/US2011/062730—ISA/EPO—Feb. 15, 2012.

Wikimedia Foundation Inc., "Region of Interest", wikipedia.org, Jun. 21, 2010, XP002668838, Retrieved from the Internet: URL:http://de.wikipedia.org/w/index.php"title=Region_of_Interest&oldid=75831972 [retrieved on Feb. 6, 2012].

* cited by examiner

ZERO DISPARITY PLANE FOR FEEDBACK-BASED THREE-DIMENSIONAL VIDEO

TECHNICAL FIELD

This disclosure relates generally to feedback-based display of video. More specifically, this disclosure describes techniques for the presentation of three-dimensional (3D) video for feedback-based video applications such as video telephony (VT) and/or human-machine interface (HMI) applications.

BACKGROUND

Feedback-based display of video, where an image of a user is displayed in real-time, have become increasingly popular in recent years. For example, feedback-based video may be used for video telephony (VT) applications. Video telephony (VT) refers to a system in which users communicate using captured bi-directional video with or without associated audio. Video and/or audio of a first user captured at a first location may be transmitted to a second user at a second location in real or close to real-time, and vice versa. One example of a two-dimensional (2D) video telephony system is the Facetime® video telephony application available for use on the iPhone4® by Apple Inc®. Other examples of 2D VT systems include video chat features such as provided by the Google Talk® web application provided by Google Inc®., and the iChat communication interface provided by Apple Inc®. Many other video telephony applications also exist.

Feedback-based video may also be used for human machine interface (HMI) applications. An HMI application may provide a mechanism for a human user to interface with a computer or other machine. Examples of HMI may include a keyboard, mouse, voice commands, or a touch-screen interface. In recent years, HMI have been developed that utilize some form of motion detection for a machine to receive feedback from a user. Non-limiting examples of motion-based HMI employ various sensors, e.g., one or more accelerometers, gyroscopes, light sensors, or other types of sensors configured to detect user motion. One example of motion-based HMI is employed by the Wii™ gaming console provided by Nintendo Inc®. Another non-limiting example is Microsoft's Kinect® interface for the Xbox® gaming console, which relies on the capture of photographic images of a user to detect user movement for purposes of device input. In some examples, an HMI system may provide for feedback to a user of detected user input (e.g., detected user motion). For example, one or more images of a user may be captured and presented via a display to the user. According to these examples, a user may view his or her movements as the movements are detected. For example, a user may, via image feedback, view himself or herself manipulating virtual objects that are presented via a display. User manipulation of virtual objects may provide machine input.

Three-dimensional (3D) video images, (e.g., for movies, television shows, and the like) have gained in popularity in recent years. For example, technologies have recently been developed (e.g., televisions, 3D glasses, Blu-ray players, gaming systems, computing devices) that allow for users to view 3D video in the home. It may be desirable to provide 3D video for feedback-based display of video, e.g., for video telephony and/or human machine interface mechanisms.

In order to provide images or video perceived as 3D by a user, according to some technologies, images that appear to be captured from slightly different perspectives may be provided to the different eyes of a user. The different perspectives provided to different eyes of the user may create the perception of depth in displayed images. Different images may be presented to each of a user's eyes via specialized glasses that filter one or more images for each eye. In some examples, to provide for 3D image display, images may be captured stereoscopically, e.g., by two or more cameras capturing the same image from different perspectives.

SUMMARY

In general, this disclosure describes techniques for providing feedback-based three dimensional video, for example, for video telephony (VT) and Human Machine Interface (HMI) applications. According to one aspect of this disclosure, techniques are described that identify a region of interest (ROI) for presentation of feedback-based video based on disparity of image pixels. Disparity may be described as a difference in pixel location between different views of a 3D video presentation. An ROI may be an area or object of captured video for which display of the captured video may be directed (e.g. focused on). For example, an ROI may be the face and/or body of a subject of captured video. An ROI may also comprise an object, such as an object a subject of captured video is holding. According to the techniques of this disclosure, an ROI may be identified based on pixel disparity, which may be determined from captured video images. For example, a closest object within captured video may be identified based on determined image disparity.

In another example, this disclosure describes techniques for the display of feedback-based 3D images. For example, a zero disparity plane (ZDP), or a plane of a displayed 3D image where one or more image objects appear with little or no disparity, may be determined based on an identified ROI of captured images. These techniques may provide for the automatic (e.g., without user intervention) adjustment of a ZDP of displayed 3D images.

For example, a method of processing stereoscopic image data is described herein. The method includes acquiring at least two stereoscopically captured images. The method further includes identifying a region of interest (ROI) of the captured at least two images. The method further includes determining a zero disparity plane (ZDP) for three-dimensional (3D) presentation of the at least two captured images based on the identified region of interest (ROI) of the at least two captured images.

According to another example, an apparatus for processing stereoscopic image data is described herein. The apparatus includes one or more processors. The one or more processors include an image capture module configured to control at least one image capture device to stereoscopically capture at least two images. They further include a region of interest (ROI) identification module configured to identify an ROI of the at least two captured images. The one or more processors further include a zero disparity plane (ZDP) determination module configured to determine a ZDP for the three-dimensional display of the captured at least two images based on the identified ROI.

According to another example, a computer-readable storage medium comprising instructions is described herein. The instructions cause one or more processors to receive at least two stereoscopically captured images. The instructions further cause the one or more processors to identify a region of interest (ROI) of the captured at least two images. The instructions further cause the one or more processors determine a zero disparity plane (ZDP) for three-dimensional (3D)

presentation of the at least two captured images based on the identified region of interest (ROI) of the at least two captured images.

According to another example, a device for processing stereoscopic image data is described herein. The device includes means for receiving at least two stereoscopically captured images. The device further includes means for identifying a region of interest (ROI) of the captured at least two images. The device further includes means for determining a zero disparity plane (ZDP) for three-dimensional (3D) presentation of the at least two captured images based on the identified region of interest (ROI) of the at least two captured images. The device further includes means for displaying the 3D presentation of the 3D presentation with the determined ZDP.

The details of one or more examples of this disclosure are set forth in the accompanying drawings and the description below. Other features, objects, and advantages of the invention will be apparent from the description and drawings, and from the claims.

DETAILED DESCRIPTION

This disclosure is directed to techniques for three-dimensional (3D) display of video. These techniques may be useful for 3D video telephony communication and/or to provide for 3D human machine interfaces (HMI). According to one example, these techniques provide for the identification of a region of interest (ROI) of a captured video presentation based on disparity between a plurality of captured views. According to another example, captured 3D video may be presented with a zero disparity plane (ZDP) based on a determined ROI, e.g., objects of an ROI may be presented with little or no disparity.

Figure 1A:
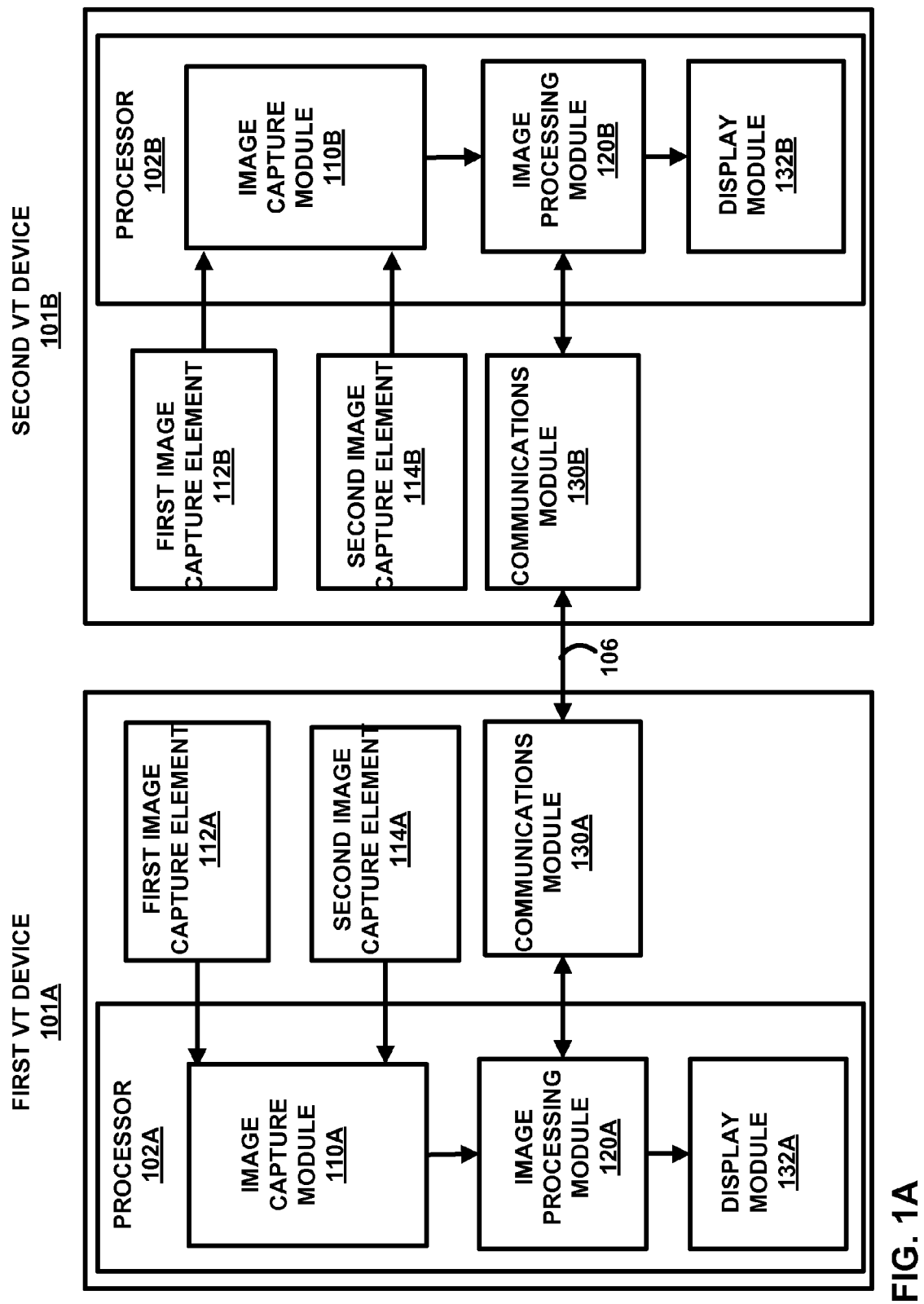
FIG. 1A is a block diagram that illustrates one example of VT devices that may be configured to process and/or display three-dimensional images consistent with the techniques of this disclosure.

FIG. 1A is a block diagram that illustrates one example of video telephony (VT) system including VT devices 101A, 101B consistent with the techniques of this disclosure. VT devices 101A, 101B may each comprise a device configured to capture video and/or display video images to a user. Non-limiting examples of devices that may be used as VT devices 101A, 101B include personal computers, laptop computers, netbooks, tablet computers, smartphones, video cameras and gaming consoles. Any other device or combination of independent devices configured to capture video and/or display video images may be used as first or second VT devices 101A, 101B. Furthermore, two or more devices may be communicatively coupled to comprise one of first or second VT devices 101A, 101B. For example, one or more of the devices described above (e.g., a personal computer) may be coupled to another device (e.g., a computer camera, commonly referred to as a webcam) via wired (e.g., universal serial bus (USB), FireWire) or wireless (e.g., Wi-Fi, Bluetooth, cellular network) to comprise a single one of VT devices 101A, 101B.

Devices 101A and 101B may be configured to allow respective first and second users to communicate with another via captured images (e.g., video). For example, first VT device 101A may capture one or more images of a first user, and communicate the captured images to device 101B. Device 101B may present received captured images to a second user. Likewise, device 101B may capture images of the second user, and communicate the captured images to the first device 101A for display to the first user.

In some examples, one or more of VT devices 101A, 101B may stereoscopically capture images. For example, as shown in FIG. 1, each of devices 101A and 101B may include respective first and second image capture elements 112A, 112B, and 114A, 114B. The first image capture elements 112A, 112B may be configured to capture respective right images of a scene. The second image capture elements 114A, 114B may be configured to capture respective left images of the scene. The first and second image capture elements may include one or more cameras configured and arranged to capture the respective right and left images of scene.

As also shown in FIG. 1A, VT devices 101A, 101B each include one or more processors 102A, 102B. Processor 102A, 102B may comprise any computing component of VT devices 101A, 101B configured to process one or more signals to cause the respective VT device 101A, 101B to operate consistent with the techniques of this disclosure. According to some examples, processor 102A, 102B may be configured to execute instructions (e.g., instructions stored on a computer-readable medium) that, when executed, configure the processor 102A, 102B as a specific computing device configured to operate consistent with the techniques of this disclosure. Processor 102A, 102B may also or instead comprise specific hardware components configured to process electrical, optical, magnetic, and/or other signals to cause VT devices 101A, 101B to operate consistent with the techniques of this disclosure.

In various examples, processors 102A, 102B may include any combination of one or more central processing units (CPUs), digital signal processors (DSPs), application specific integrated circuits (ASICs), field programmable gate array (FPGAs), or other circuits. In some cases, processors 102A and 102B may be configured to execute instructions that cause one or more of VT devices 101A, 101B, to operate consistent with the techniques described herein. In such cases, the instructions may be stored in one or more computer-readable medium (not shown) of VT devices 101A, 101B. For example, the instructions may be stored in a storage element or device (not shown), which may comprise one or more of a random access memory (RAM) component, a hard disc memory component, and/or a Flash or other solid state memory component of VT devices 101A, 101B.

In the example of FIG. 1A various modules 110A, 110B, 120A, 120B, and 132A, 132B of VT devices 101A, 101B are shown as being implemented a single respective processor 102A, 102B. In other examples, however, one or more of these modules of FIG. 1A may be implemented in more than one distinct hardware component (e.g., one or more combinations of CPUs, DSPs, ASICs, FPGAs, microprocessors, specific hardware components, or like component capable of processing signals).

As shown in FIG. 1A, the respective first and second VT devices 101A, 101B each include an image capture module 110A, 110B. Image capture modules 110A, 110B may be configured to control the respective first and second camera elements 112A, 112B, 114A, and 114B to capture images. For example, image capture modules 110A, 110B may be configured to control when camera elements 112A, 112B, 114A, 114B are operated to capture video images, and/or focus camera elements 112A, 112B, 114A, 114B or otherwise control camera elements 112A, 112B, 114A, 114B with respect to objects within captured images. In some examples, the first and second camera elements 112A, 112B, 114A, 114B may include one or more mechanical actuators that allow for one or more of the first and second camera elements 112A, 112B, 114A, 114B to be aimed for the capture of video. According to these examples, image capture modules 110A, 110B may control the one or more mechanical actuators so as to aim camera elements 112A, 112B, 114A, 114B.

As also shown in FIG. 1A, first and second VT devices 101A, 101B may also include display modules 132A, 132B. The respective display modules 132A, 132B may each be configured to control one or more displays (not shown) for the presentation of images. For example, display module 132A of first VT device 101A may be configured to control one or more displays to present images received from second VT device 101B (e.g., via communications modules 130A, 130B).

The respective display modules 132A, 132B may be configured to control one or more stereoscopic displays, e.g., one or more displays configured to present respective right and left images simultaneously such that a user perceives displayed images three-dimensionally. For example, display modules 132A, 132B may be configured to control one or more displays in conjunction with specialized glasses that a viewer may wear to cause respective right and left images to be viewed by the viewer's right and left eyes. For example, the specialized glasses may present the respective right and left images via differences such as polarization, wavelength, frequency, or other filtering. In some examples, display modules 132A, 132B may be configured to control one or more displays that are synchronized with specialized glasses. For example, the specialized glasses may act as shutters to transition between clear and dark states in synchronization with a display presenting respective right and left images. According to this example, the specialized glasses and display may transition between presenting right and left images at a frequency faster than detectable by the human eye, such that the transitions are substantially un-noticeable to a viewer. According to other examples, display modules 132A, 132B may instead be configured to control a display that does not require specialized glasses (e.g., an autostereoscopic display). According to both stereoscopic and autostereoscopic examples described above, differences between the respective right and left images (views) of a three-dimensional video presentation may cause one or more displayed images to be perceived as having depth, e.g., such that some objects of an image appear to be in front of, or behind, a display surface.

As also shown in FIG. 1A, first and second VT devices 101A, 101B may further each include an image processing module 120A, 120B. Generally speaking, image processing modules 120A, 120B may receive one or more representations of captured images (e.g., from image capture modules 110A, 110B), and process the one or more representations for display, storage, and/or communication. According to one example, image processing module 120A, 120B may process one or more representations of captured images for purposes of creating a presentation suitable for stereoscopic display. For example, image processing modules 120A, 120B may process one or more representations to create respective right and left views that may be displayed in conjunction to cause the images to appear substantially three-dimensional to a viewer. In some cases, image processing modules 120A, 120B may be configured to communicate one or more processed image representations to display module 132A, 132B. Display module 132A, 132B may be configured to control a stereoscopic display (not shown in FIG. 1) for the presentation of images.

In one example, each respective image processing module 120A, 120B may process one or more representations of captured images received from one or more image capture modules 110A, 110B of the same VT device 101A, 101B that includes the respective image processing module 120A, 120B. For example, image processing module 120A may receive one or more representations of captured images from image capture module 110A, process the one or more representations, and communicate the processed one or more representations to second VT device 101B via a communications module 130A of first VT device 101A. Second VT device 101B may receive the one or more representations via communications module 130B, use the processed one or more representations to display video images (e.g., via display module 132B).

According to another example, one or more unprocessed representations of captured images may be communicated to second VT device 101B via communications module 130A. According to this example, image processing module 120B of second VT device 101B may process the received one or more representations, and communicate the processed one or more representations to display module 132B for presentation via a display coupled to second VT device 101B. In still another example, captured images may be processed by respective image processing modules 120A, 120B of the first and second VT devices 101A, 101B in combination.

According to the various examples described above, one or more processed or non-processed representations of captured images may be communicated between first and second VT devices using respective communications modules 130A, 130B via a communications channel 106. The respective communications modules 130A, 130B may be configured to communicate information regarding captured images, such as representations of captured images, via any known form of communication. Non-limiting examples of communication techniques that may be used by communications modules 130A, 130B include wired communications (e.g., any physical transmission line, whether electrical, optical or otherwise) and wireless communications (e.g., Wi-Fi®, cellular network, Bluetooth®). In some cases, communications modules 130A, 130B may communicate using the Internet or another private, public or global network. Generally, any other form of electronic communication could be used to allow for communications between communications modules 130A, 130B. In some examples, the one or more processed or non-processed representations may be communicated in their entirety between VT devices 101A, 101B. In other examples, one or more processed or non-processed representations may be communicated between VT devices 101A, 101B according to a streaming protocol, such as a hypertext transfer protocol (HTTP) streaming protocol.

Figure 1B:
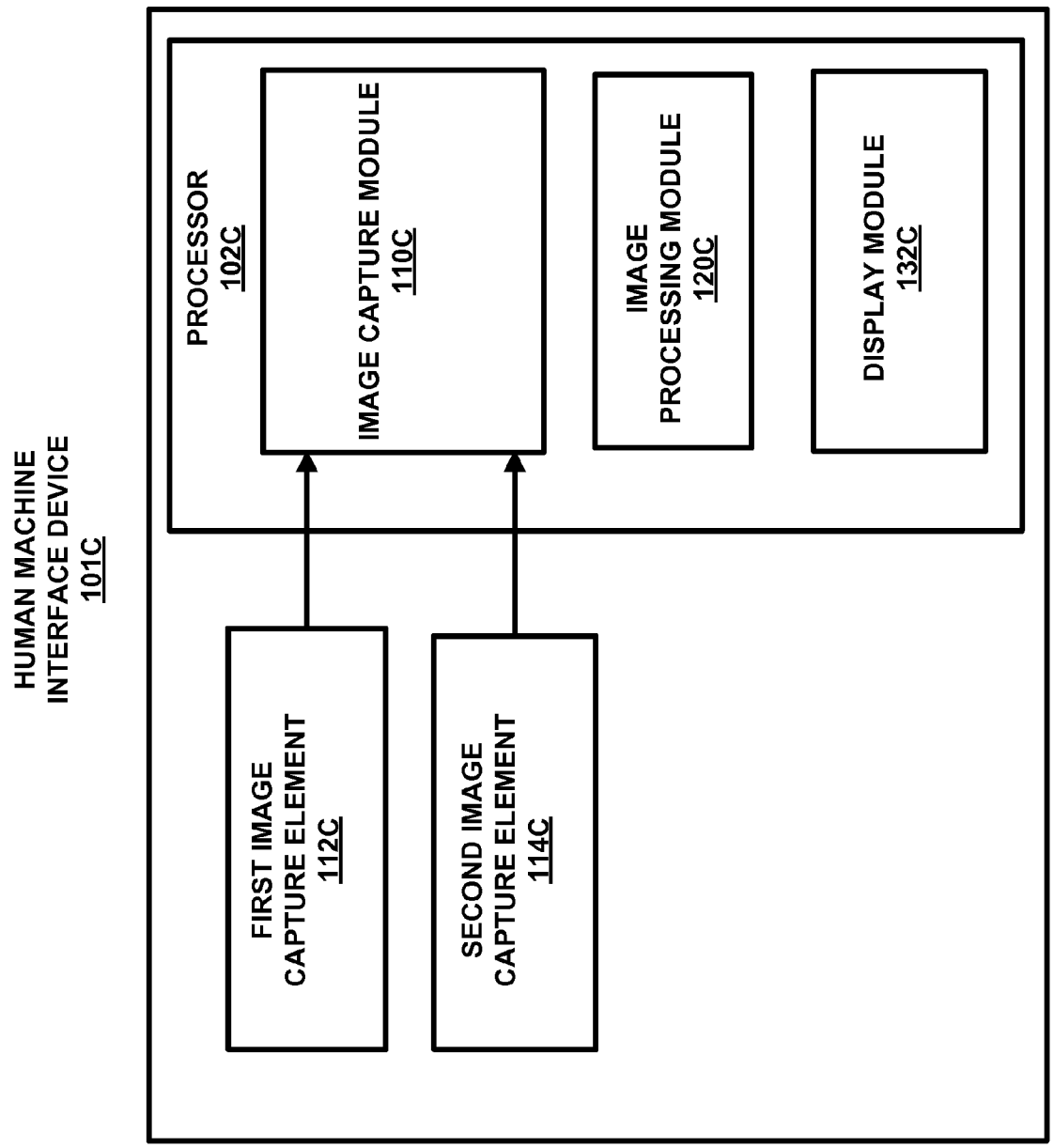
FIG. 1B is a block diagram that illustrates one example of a human-machine interface (HMI) device configured to process and/or display three-dimensional images consistent with the techniques of this disclosure.

FIG. 1B is a block diagram illustrating one example of a human machine interface (HMI) device 101C consistent with the techniques of this disclosure. HMI device 101C may comprise any device configured to capture video and/or display video images to a user. Non-limiting examples of devices that may be used as HMI device 101C include personal computers, laptop computers, netbooks, tablet computers, smartphones, gaming consoles, or control systems for the control of a wide variety of devices or computers. A wide variety of devices or combination of independent devices could be configured to capture video and/or display video images, and thus, may be used as HMI device 101C.

HMI device 101C may be configured to provide a user with feedback-based video for purposes of controlling HMI device 101C. For example, HMI device 101C may capture images of a user of HMI device 101C. HMI device 101C may present captured images of the user to the user, along with one or more other images (e.g., virtual objects). A user may view him or herself manipulating the one or more other images. Manipulation of the one or more images may allow a user to control HMI device 101C.

In some examples, HMI device 101C may be configured to stereoscopically capture video images. For example, as shown in FIG. 1B, HMI device 101C includes respective first and second image capture elements 112C, 114C. First image capture element 112C may be configured to capture one or more right images of a subject (e.g., a user). Second image capture element 114C may be configured to capture one or more left images of a subject.

As shown in FIG. 1B, HMI device 101C includes one or more processors 102C. Processor 102C may comprise any computing component of HMI device 101C configured to execute instructions configured to cause the respective HMI device 101C to operate consistent with the techniques of this disclosure. Once executed by processor 102C the instructions may configure the processor 102C as a specific computing device configured to operate consistent with the techniques of this disclosure.

As also shown in FIG. 1B, HMI device 101C includes one or more processors 102C. Processor 102C may comprise any computing component of HMI device 101C configured to process one or more signals to cause HMI device 101C to operate consistent with the techniques of this disclosure. According to some examples, processor 102C may be configured to execute instructions (e.g., instructions stored on a computer-readable medium) that, when executed, configure the processor 102C as a specific computing device configured to operate consistent with the techniques of this disclosure. Processor 102C may also or instead comprise specific hardware components configured to process electrical, optical, magnetic, and/or other signals to cause HMI device 101C to operate consistent with the techniques of this disclosure.

In various examples, processor 102C may include any combination of one or more central processing units (CPUs), digital signal processors (DSPs), application specific integrated circuits (ASICs), field programmable gate array (FPGAs), or other circuits. In some cases, processor 102C may be configured to execute instructions that cause HMI device 101C, to operate consistent with the techniques described herein. In such cases, the instructions may be stored in one or more computer-readable medium (now shown) of HMI device 101C. For example, the instructions may be stored in a storage element or device (not shown), which may comprise one or more of a random access memory (RAM) component, a hard disc memory component, and/or a Flash or other solid state memory component of HMI device 101C.

In the example of FIG. 1B various modules 110C, 120C, and 132C of HMI device 101C are shown as being implemented via a single processor 102C. In other examples, however, one or more of these modules of FIG. 1C may be implemented in more than one distinct hardware component (e.g., one or more combinations of CPUs, DSPs, ASICs, FPGAs, microprocessors, specific hardware components, or like component capable of processing signals).

As shown in FIG. 1B, HMI device 101C includes image capture module 110C. Image capture module 110C may be configured to control respective first and second camera elements 112C, 114C to capture images. For example, image capture module 110C may be configured to control when first and second camera elements 112C, 114C are operated to capture video images, and/or a focus of image capture. In some examples, first and second camera elements 112C, 114C may include one or more mechanical actuators that allow for first and second camera elements 112C, 114C to be aimed for the capture of video. According to these examples, image capture modules 110C may control the one or more mechanical actuators to aim first and second camera elements 112C, 114C.

HMI device 101C may also be configured to process one or more images captured by image capture elements 112C, 114C. As also shown in the example of FIG. 1B, HMI device 101C includes image processing module 120C. Generally speaking, image processing module 120C may receive one or more representations of captured video images (e.g., from image capture elements 112C, 114C), and process the one or more representations for display. For example, image processing module 120C may process one or more captured images for display along with other images. Image processing module 120C may also or instead process the one or more representations for stereoscopic display. For example, image processing module 120C may be configured to generate respective right and left views that may be displayed in conjunction to cause display of a video presentation that appears substantially three-dimensional to a viewer.

Image processing module 120C may communicate one or more processed representations of captured video images to display module 132C. Display module 132C may control one or more displays (e.g., a stereoscopic display, not shown in FIG. 1B) to display one or more images based on the received processed representation of captured video images. In some examples, HMI device 101C may be operative such that images captured by image capture elements 112C, 114C are processed and/or displayed by display module 132C in real or close to real-time.

Display module 132C may be configured to control one or more displays (e.g., a stereoscopic display, not shown in FIG. 1B) for the presentation of images. For example, display module 132C may be configured to control one or more displays to present images received from image processing module 120C. For example, display module 132C may be used in conjunction with specialized glasses that a viewer may wear to cause respective right and left images to be viewed by a viewer's right and left eyes. For example, the specialized glasses may present the respective right and left images via differences such as polarization, wavelength, frequency, or other filtering. In some examples, display module 132C may be configured to control one or more displays that are synchronized with specialized glasses. For example, the specialized glasses may act as shutters to transition between clear and dark states in synchronization with a display presenting respective right and left images. According to this example, the specialized glasses and display may transition between presenting right and left images at a frequency faster than detectable by the human eye, such that the transitions are substantially un-noticeable to a viewer. According to other example, display module 132C may instead be configured to control a display that does not require specialized glasses (e.g., an autostereoscopic display). According to both stereoscopic and autostereoscopic examples described above, differences between the respective right and left images (views) of a three-dimensional video presentation may cause one or more displayed images to be perceived as having depth, e.g., such that some objects of an image appear to be in front of, or behind, a display surface.

FIGS. 1A and 1B depict VT devices 101A, 101B and HMI device 101C (collectively referred to as devices 101 hereinafter), which may each share elements in common. For examples, devices 101 each include first and second image capture devices 112A-112C and 114A-114C (collectively image capture devices 112, 114, respectively, hereinafter), image capture module 110A-110C (collectively referred to as image capture module 110 hereinafter), image processing module 120A-120C (collectively referred to as image processing module 120 hereinafter), and display control module 132A-132C (collectively referred to as display control module 132 hereinafter).

For purposes of illustration only, devices 101 are depicted including first 112 and second 114 image capture elements configured to stereoscopically capture images of slightly different perspectives for purpose of 3D display of the captured images. According to other examples not depicted, any of devices 101 may instead or additionally include other configurations of image capture elements configured to stereoscopically capture images for 3D presentation. For example, a multi-view image capture technique may be used, where devices 101 include a plurality of camera elements (e.g., more than two) configured to capture different perspective images of a scene. In another example, devices 101 may use a plenoptic camera configured to capture multiple views of an image using a single lens.

Figure 2:
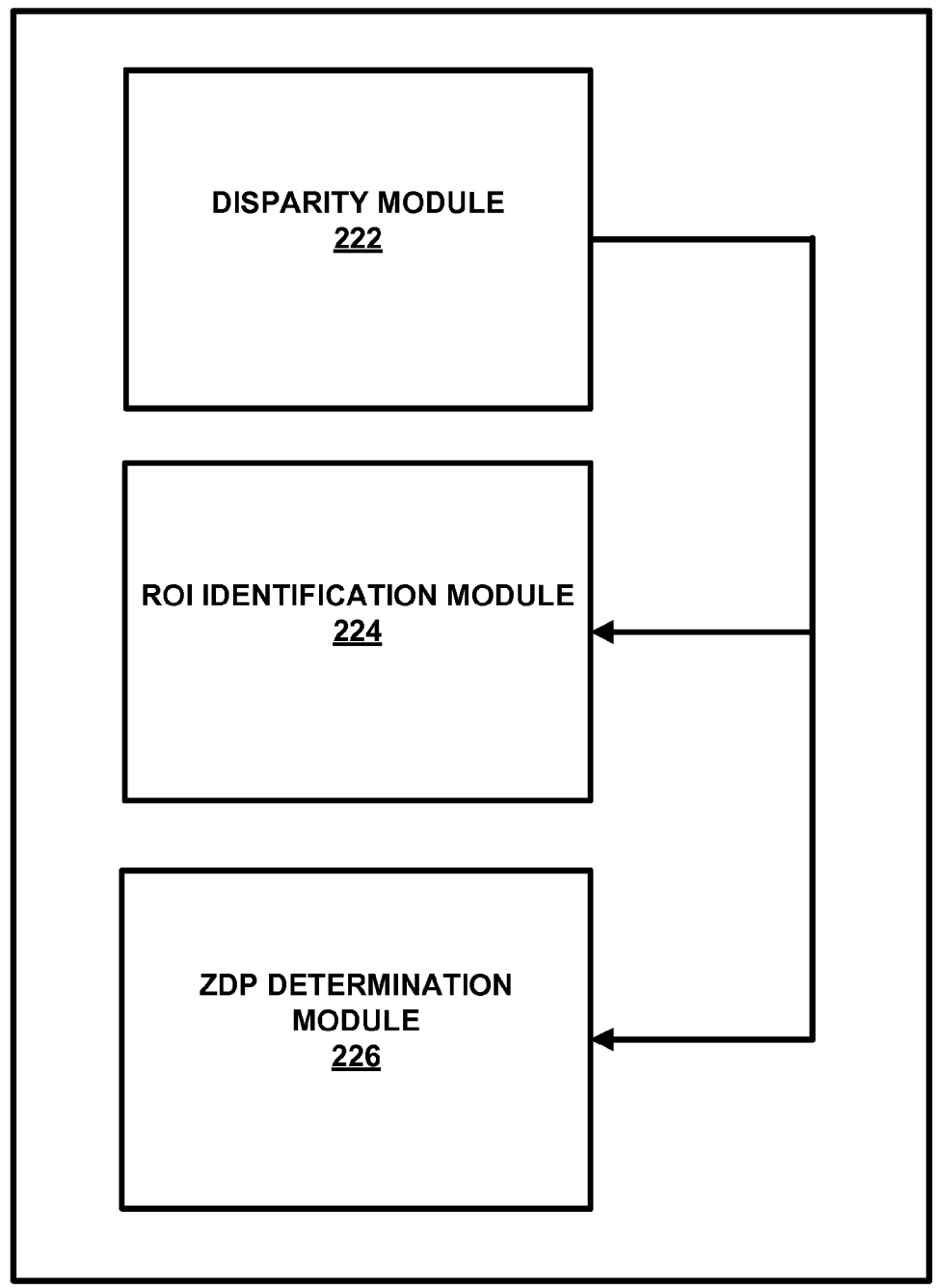
FIG. 2 is a block diagram that illustrates one example of an image processing module of a VT or HMI device consistent with the techniques of this disclosure.

FIG. 2 is a block diagram that illustrates one example of an image processing module 220. As described above, image processing module 220 may be a component implemented via hardware, software, or any combination of hardware or software configured to process one or more images for display. For example, image processing module 220 may be generally configured to process images for three-dimensional display.

As shown in FIG. 2, image processing module 220 includes a disparity module 222. Disparity module 222 may be configured to process one or more pixels of at least two captured images, to determine disparity of the one or more pixels between the at least two captured images. As shown in FIG. 2, image processing module 220 further includes a ROI identification module 224. In some examples, ROI identification module 224 may identify an ROI in captured images by receiving user input indicating a desired ROI. For example, one or more VT or HMI devices 101 may be configured to receive user input indicating a desired ROI. ROI identification module 224 may instead use other techniques to automatically determine an ROI of captured images. For example, ROI identification module 224 may use one or more computer vision algorithms or other techniques to automatically determine an ROI of captured images. Non-limiting examples of algorithms and/or techniques that may be used include motion estimation (relative movement of image pixels/objects), optical flow (e.g., representation of an apparent motion of object brightness patterns in a visual plane caused by relative motion between an observer of presentation and objects of presentation), and/or blurriness (e.g., relative blurriness of image objects, where less blurriness indicates that an image object is closer to an observer), facial recognition techniques (e.g., utilizing Haar wavelets), object recognition (e.g., utilizing a scale invariant feature transform (SIFT) algorithm or other techniques to identify an object with a known texture), color histogram (utilizing pixel color to identify image objects), or any other technique for automatically determining an ROI of captured images.

As also shown in FIG. 2, image processing module 220 further includes a ZDP determination module 226. ZDP determination module 226 may be configured to receive, from ROI identification module 224, an indication of an ROI of captured images. ZDP determination module 226 may, based on the identified ROI, determine a zero disparity plane (ZDP) for the display of 3D images. A ZDP may be described as a plane of a displayed 3D image for which image objects appear substantially two-dimensional (2D) to a viewer, e.g., image objects that appear substantially at or near a display surface. Objects of a ZDP may have little or no difference (e.g., little or no disparity), between respective right and left views of the image. A 3D image may also comprise other image objects not of the ZDP, e.g., images that appear in front of or behind the display surface due to differences (disparity) between respective right and left images. In some examples, disparity of image pixels may be represented by a positive (in front of ZDP) or negative (behind ZDP) value. When viewing a 3D image, objects may appear to extend outwardly from, or fall behind, a ZDP of the 3D image. ZDP determination module 226 may process captured images such that they may be displayed with a ZDP at or near the identified ROI. As an example, ZDP determination module 226 may process captured images to align (e.g., shift a relative location), crop, and/or otherwise process captured images such that one or more objects of an ROI are displayed such that they appear at or near a surface of a display presenting the 3D images. Once aligned, shifted, and/or otherwise processed, a disparity value of image pixels within an identified ROI may be close to or substantially equal to zero.

According to some examples, as shown in FIG. 2, ZDP determination module may receive one or more indications of pixel disparity from disparity modules 222. For example, ZDP determination module may receive one or more indications of pixel disparity for pixels of an ROI of captured images. Based on the one or more indications, ZDP determination module 226 may process (e.g., align, crop, or otherwise process) captured images to be displayed with a ZDP at or near an identified ROI (e.g., pixels and/or objects of an ROI may be displayed with little or no disparity) based on determining a typical disparity of pixels of the ROI (e.g., via disparity module 222). According to one example, ZDP determination module 226 may determine the typical disparity of the ROI by creating a histogram representing relative disparity of pixels of the ROI, and selecting a bin of the histogram with a largest number of pixels. Accordingly, ZDP determination module may process captured images such that they may be displayed with a ZDP at or near a depth of the typical disparity.

Figure 3:
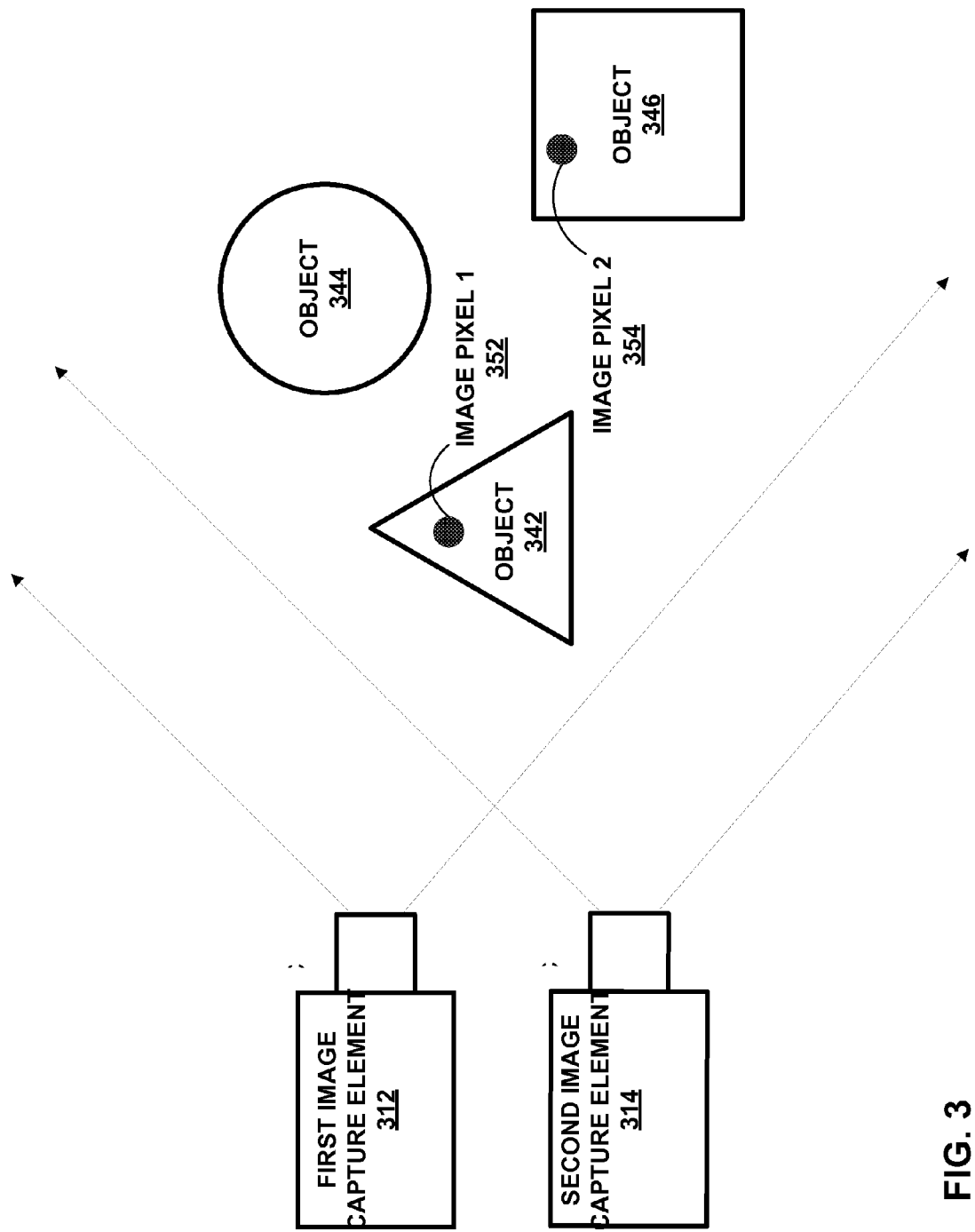
FIG. 3 is a conceptual diagram that illustrates one example of stereoscopic image capture of a scene consistent with the techniques of this disclosure.

FIG. 3 is a conceptual diagram that illustrates one example of stereoscopic (e.g., via two or more cameras) capture of images. As shown in FIG. 3, image capture elements 312, 314 may be configured to capture respective first and second images of objects 342, 344, and 346. According to the example shown in FIG. 3, second image capture element 314 may capture images of the same scene (e.g., comprising objects 342, 344, 346), but from a slightly different perspective than first image capture element 312. In some examples, the respective first and second image capture elements 312 may be configured to capture respective right and left views of a scene. Captured right and left images may be processed and displayed in conjunction to a user as a 3D video presentation.

In the example of FIG. 3, object 342 includes an image pixel 352. Likewise, object 346 includes an image pixel 354. Image pixels 352, 354 may represent particular points of objects 342 and 346, respectively, in images captured by first and second camera elements 312, 314. Due to different perspectives between first and second image capture elements 312, 314, image pixels 352, 354 may appear in different locations in images captured by the respective image capture elements 312, 314. Such a difference in pixel location between respective captured images (e.g., respective right and left images), may be described as a disparity for the pixel. Disparity may be indicated as a number of pixels. For example, disparity may be represented as a number of pixels and/or fractions of pixels between respective locations of the same pixel in at least two captured images. In some examples, disparity may be positive or negative disparity. For example, a positive disparity for a pixel may indicate that the pixel is of an object that appears in front of a reference plane (e.g., a ZDP of captured images). According to this example, a negative disparity for a pixel may indicate that the pixel appears behind a reference plane (e.g., the ZDP of captured images).

According to one aspect of this disclosure, determined disparity of image pixels between captured images may be used to determine a region of interest of the captured images. According to another aspect of this disclosure, determined disparity of image pixels between captured images may be used to determine a ZDP for the display of captured images (e.g., via a stereoscopic display).

Figure 4:
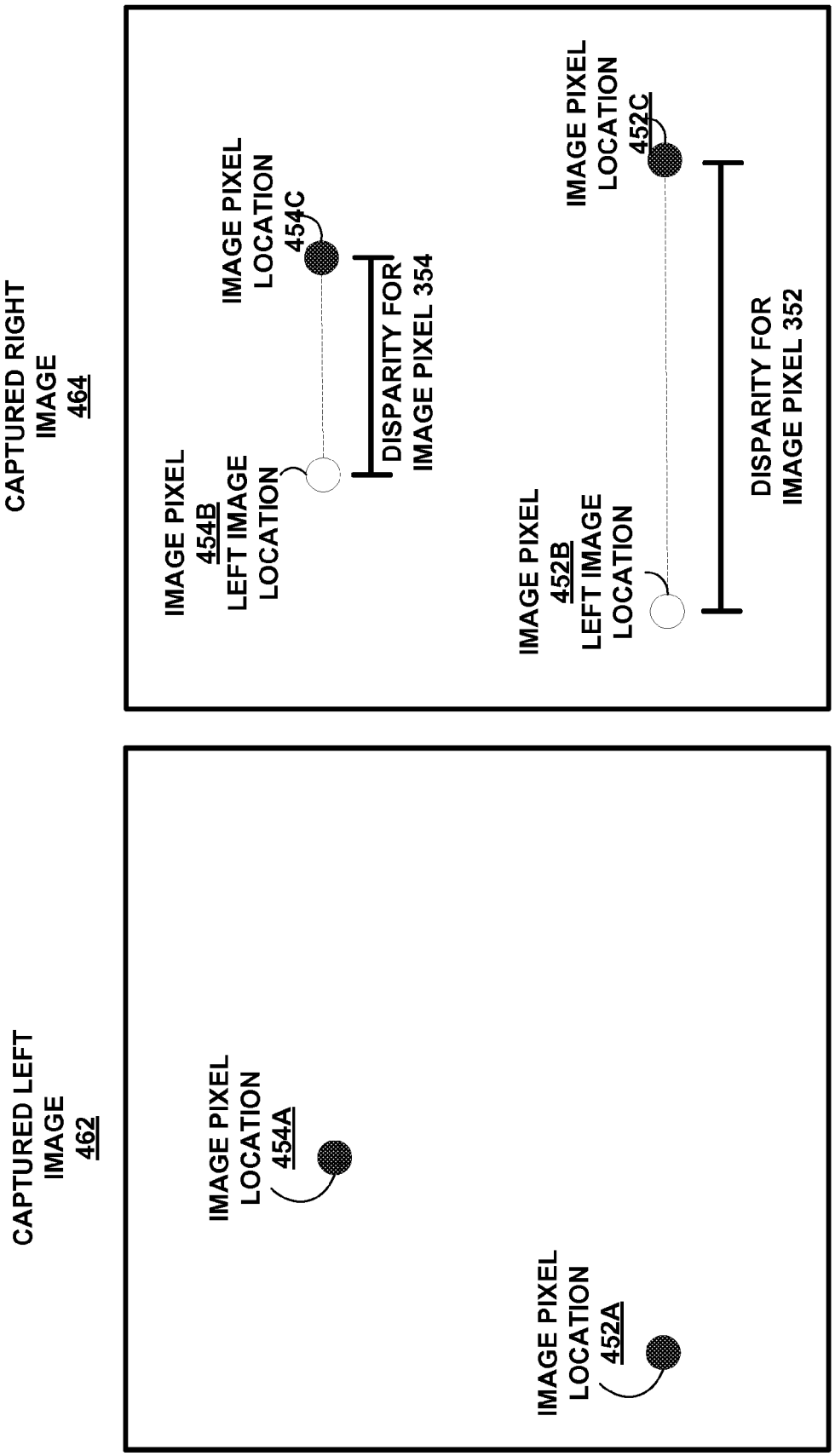
FIG. 4 is a conceptual diagram that illustrates respective pixel locations in stereoscopically captured right and left images consistent with the techniques of this disclosure.

FIG. 4 is a conceptual diagram that illustrates one example of disparity between a captured left image 462 and a captured right image 464. The respective captured right and left images 462, 464 may be captured by a stereoscopic camera, e.g., a camera including first and second camera elements 312, 314 as illustrated in FIG. 3.

As shown in FIG. 4, captured left image 462 includes an indication of respective locations 452A, 454A for first and second pixels in captured left image 462. Similarly, captured right image 464 includes an indication of respectively locations 452C and 454C in captured right image 464. For illustrative purposes, captured right image 464 further includes an indication of respective locations 452B, 454B, which correspond to locations 452A and 454A of captured left image 462. The various pixel locations 452A, 452B, and 452C may correspond to pixel 352 of object 342 illustrated in FIG. 3. Similarly, the various pixel locations 454A, 454B, and 454C may correspond to pixel 354 of object 346 illustrated in FIG. 3.

As shown in the example of FIG. 4, a pixel that represents a particular point (e.g., of an object) in captured images may have a different location in a captured left image 462 than a capture right image 464, due to different positioning of respective image capture elements (e.g., image capture elements 312, 314 in FIG. 3). As shown at the bottom of captured right image 464, an image pixel 352 may be in a first location 452A in a captured left image 462, while the image pixel 352 may be in a second location 452C in a captured right image 464. A difference between these locations may be considered a disparity of pixel 352 between the respective right and left captured images 462, 464. Similarly, as shown at the top of captured right image 464, an image pixel 354 may be in a first location 454A in a captured left image 462, while the image pixel 354 may be in a second location 454C in a captured right image 464. A difference between these locations may be considered a disparity of pixel 354 between the respective right and left captured images 462, 464. As also shown in FIG. 4, a disparity of one pixel may be greater or less than a disparity of another pixel between captured images. For example, as shown in FIG. 4 a disparity for pixel 452 (e.g., a difference between pixel locations 452B and 452C) is greater than for pixel 454 (e.g., a difference between pixel locations 454B and 454C).

According to the techniques of this disclosure, image processing module 120 (e.g., disparity module 222) may determine disparity for one or more pixels of captured images. According to one aspect of this disclosure, image processing module 120 (e.g., ROI identification module 224) may use the determined disparity to identify a region of interest (ROI) of captured images. An ROI may be a region of captured images that include an object or objects of interest in the captured video. An ROI may comprise the face or body of a subject. In another example, an ROI may be comprise an object, a whiteboard, the hand of a subject, or any other object. In some examples, image processing module 120 may identify an ROI as one or more object of captured images that are closest to one or more observers (e.g., image capture device 312, 314) of the captured images.

According to some examples consistent with the techniques of this disclosure, image processing module 120 may use pixel disparity to determine how close, or how far away, an image pixel (e.g., point of an object or subject of captured images) is from an observer. For example, pixels of an object that is closer to an observer may have a larger disparity than pixels of an object further away from the observer. For example, according to the example illustrated in FIG. 3, pixel 352 of object 342 is closer to an observer, while pixel 354 of object 344 is further away from the observer. According to the example of FIG. 4, as shown in FIG. 4, image processing module 120 may determine that pixel 352 has a greater disparity (as shown in FIG. 4 between left image pixel location 452B, and right image pixel location 452C) between captured right and left images 462 and 464 than image pixel 354 (as shown in FIG. 4 between left image pixel location 454B, and right image pixel location 454C). Accordingly, image processing module 120 may identify image object 342 as an ROI, based on disparity determined for image pixels 352, 354.

Image processing module 120 may use an identified ROI to, as one example, focus image capture on one or particular objects of captured images. Image processing module 120 may also or instead use an identified ROI for purposes of displaying captured images. For example, image processing module 120 may process captured images with a focus on objects of an ROI, or so that the ROI is made prominent (e.g., zoomed in upon, lighting, displayed in a bright color, or other effects) in displayed video. Image processing module 120 may also (or instead) use an identified ROI to determine a ZDP for the display of captured images consistent with the techniques of this disclosure.

Also, in some examples an identified ROI of captured images may change while images are being captured. According to one example, image processing module 120 may use disparity of image pixels to identify a subject's face as an ROI of the image, because the subject's face is the closest to one or more image capture elements (e.g., an observer) that captured the images. The subject may then hold out an object, such as an object (e.g., a photo), in front of the observer. Image processing module 120 may automatically determine, e.g., based on disparity of image pixels, that the object is now closest to an observer of captured images. Accordingly, based on pixel disparity, image processing module 120 may identify the held out object as a new ROI of the captured images. Image processing module 120 as described herein may also or instead be configured to automatically determine a change in ROI based on other techniques. For example, ROI identification module 224 may use one or more computer vision algorithms or other techniques to automatically determine an ROI of captured images. Non-limiting examples of algorithms and/or techniques that may be used include motion estimation (relative movement of image pixels/objects), optical flow (e.g., representation of an apparent motion of object brightness patterns in a visual plane caused by relative motion between an observer of presentation and objects of presentation), and/or blurriness (e.g., relative blurriness of image objects, where less blurriness indicates that an image object is closer to an observer), facial recognition techniques (e.g., utilizing Haar wavelets), object recognition (e.g., utilizing a scale invariant feature transform (SIFT) algorithm or other techniques to identify an object with a known texture), color histogram (utilizing pixel color to identify image objects), or any other technique for automatically determining an ROI of captured images. According to other examples, ROI identification module 224 may identify a change in ROI of captured images based on receipt of user input indicating a change in ROI.

Figure 5:
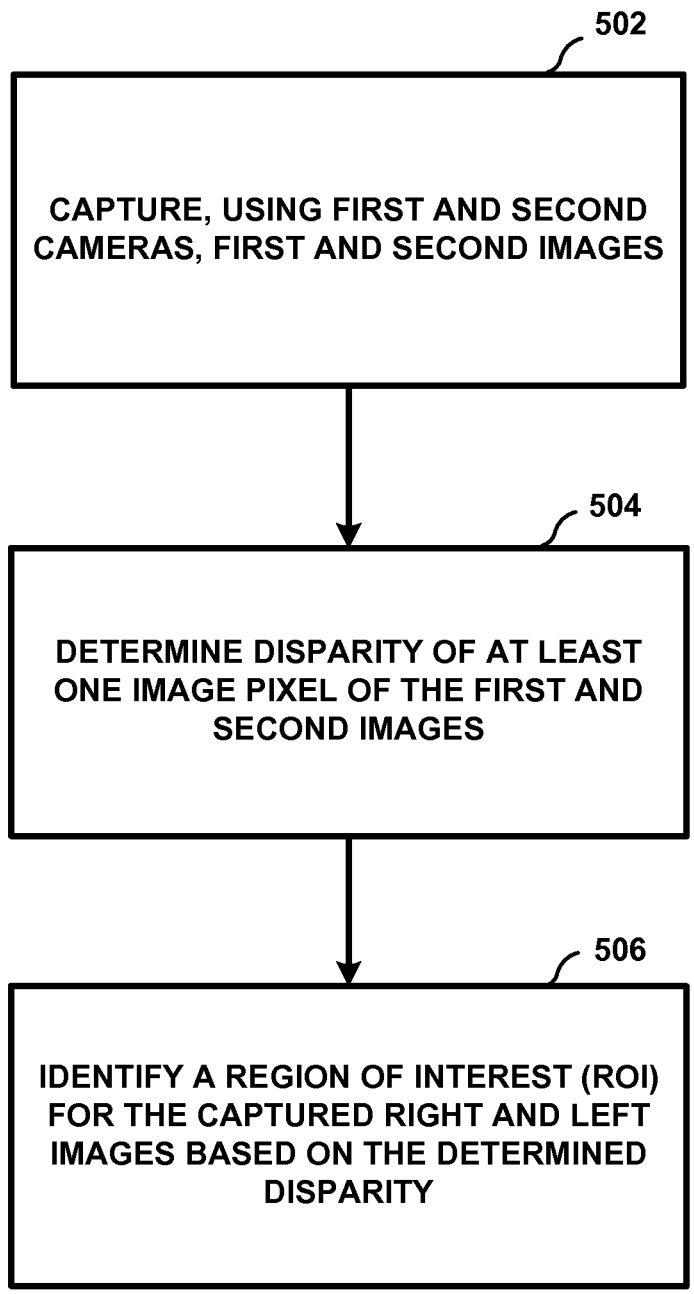
FIG. 5 is a flow chart that illustrates one example of a method of identifying a region of interest (ROI) in captured images consistent with the techniques of this disclosure.

FIG. 5 is a flow chart that illustrates one example of a method of determining a region of interest for one or more captured images of a scene. According to the example of FIG. 5, image capture module 110 may control at least two image capture elements (e.g., image capture elements 112, 114) to capture first and second images of a scene (502). The captured first and second images of the scene may include at least one image pixel. The at least one image pixel may represent a point in the captured scene. As also shown in FIG. 5, image processing module 120 (e.g., disparity module 222) may determine disparity for at least one pixel of the first and second images (504). Image processing module 120 may determine disparity by determining a difference between respective locations of the at least one pixel between the first and second images. Image processing module 120 (e.g., ROI identification module 224) may further identify a region of interest of the captured images based on the determined disparity for the at least one pixel (506).

According to one example, image processing module 120 may determine disparity for a plurality of pixels of the first and second captured images. The plurality of pixels may comprise all pixels of the first and second captured images, or instead may comprise a subset of pixels of the first and second images. For example, image processing module 120 may identify pixels of objects of the scene, and determine disparity for the identified pixels. Image processing module 120 may determine pixels of objects of a scene based on edge detection techniques for the processing of images.

According to one example, image processing module 120 may identify an ROI based on determining pixels of captured images with a greatest amount of disparity, or a greatest displacement between at least two views of captured images. Image processing module 120 may identify, based on what pixels have the greatest disparity, one or more objects of captured images that are closest to an observer of the captured images. Accordingly, image processing module 120 may identify the one or more objects closest to the observer of captured images as an ROI of the captured images.

According to one aspect of this disclosure, as described above with respect to FIG. 5, image processing module 120 may use disparity of image pixels to identify an ROI for stereoscopically captured images. According to another aspect of this disclosure as described in further detail below, image processing module 120 may determine a zero disparity plane for the display of one or more captured images based on an ROI identified according to the example of FIG. 5, or an ROI identified according to other techniques.

Figure 6:
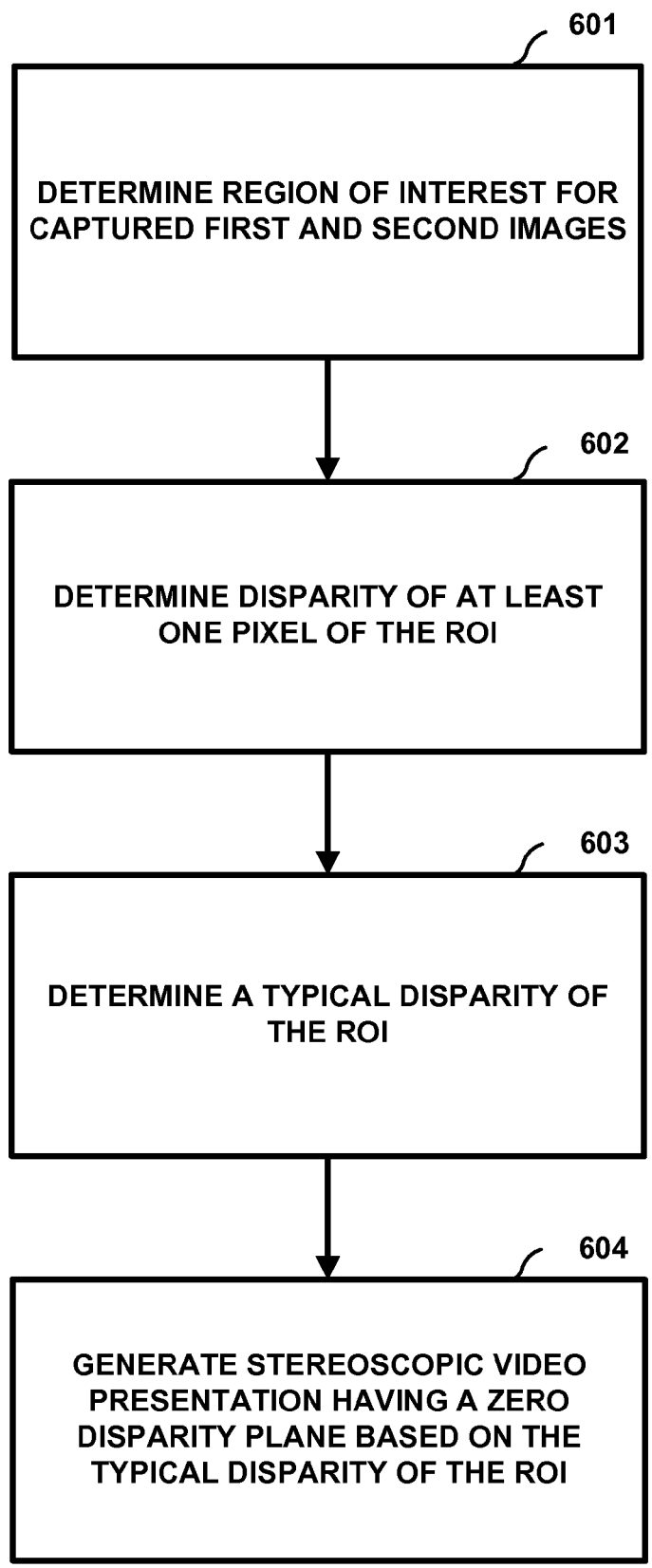
FIG. 6 is a flow chart that illustrates one example of a method of determining a zero disparity plane (ZDP) for a 3D presentation based on an identified ROI of captured images consistent with the techniques of this disclosure.

FIG. 6 is a flow chart that illustrates one example of a method of identifying a zero disparity plane for the stereoscopic display of feedback-based images (e.g., video images). As shown in FIG. 6, image processing module 120 (e.g., ROI identification module 224) may identify an ROI for at least two captured first and second images (e.g., stereoscopically captured images) (601). Image processing module 120 may identify the ROI automatically. For example, image processing module 120 may identify the ROI based on determined disparity for at least one pixel of the captured images as described above with respect to FIG. 5.

According to other examples, image processing module 120 may automatically identify the ROI based on other techniques for automatically identifying an ROI. For example, image processing module 120 may utilize other techniques that rely on identification of a closest object to an observer of captured images. For example, image processing module 120 may use one or more computer vision algorithms or other techniques to automatically determine an ROI of captured images as described herein.

According to other examples, image processing module 120 may determine ZDP for stereoscopic display based on an ROI identified based on receiving user input indicating a desired ROI. For example, a VT or HMI device 101 may be configured to receive an indication of a desired ROI from a user, such as via a mouse, keyboard, touch-screen, or voice prompt selection of a desired ROI. According to one such example where device 101 includes a touch-sensitive display, a user may input a desired ROI by interacting (e.g., touching) the touch-sensitive display at or near an object (e.g., a subject's face, or other object of displayed images) to identify an object as a desired ROI.

As also shown in FIG. 6, image processing module 120 may further determine disparity for at least one pixel (e.g., via disparity module 222) of the ROI identified at step 601 (602). In one example, image processing module 120 may determine disparity for all pixels of an identified ROI. In other examples, image processing module 120 may determine disparity for a subset of pixels of an identified ROI. For example, image processing module 120 may identify at least one object of the ROI, and correspondingly determine disparity for image pixels of the identified at least one object.

As also shown in FIG. 6, image processing module 120 may further determine a typical disparity of the ROI (603). According to one such example, image processing module 120 may determine the typical disparity by averaging a determined disparity for those pixels for which disparity was determined at step 602 (e.g., all or a subset of pixels of the ROI). According to another example, image processing module 120 may determine a typical disparity for the ROI by assigning pixels of the ROI to a histogram that comprises a number of bins that correspond to various disparity ranges as described below with respect to FIG. 7. According to these examples, image processing module 120 may identify a disparity range of a bin for which a largest number of pixels was assigned as a typical disparity of an ROI.

As also shown in FIG. 6, image processing module 120 may be operative to generate a stereoscopic video presentation having a ZDP based on the identified typical disparity of the ROI (604). As described above, differences between the respective right and left images provided via a stereoscopic display may cause one or more displayed images to be perceived as having depth, e.g., such that some objects of an image appear to be in front of, or behind, a display surface of a display. In some examples, image processing module 120 (and/or display control module 132) may generate a stereoscopic video presentation having a ZDP based on an identified typical disparity by aligning, cropping and/or otherwise processing respective first and second (e.g., right and left) views of the stereoscopic video presentation to cause one or more pixels and/or image objects of an identified ROI to be displayed with little or no disparity (e.g., appear at or near a surface of a stereoscopic display), while causing one or more other pixels and/or image object to appear in front of, or behind, a surface of a display. Techniques for aligning one or more stereoscopic views are described in further detail below with respect to FIG. 13.

Figure 7:
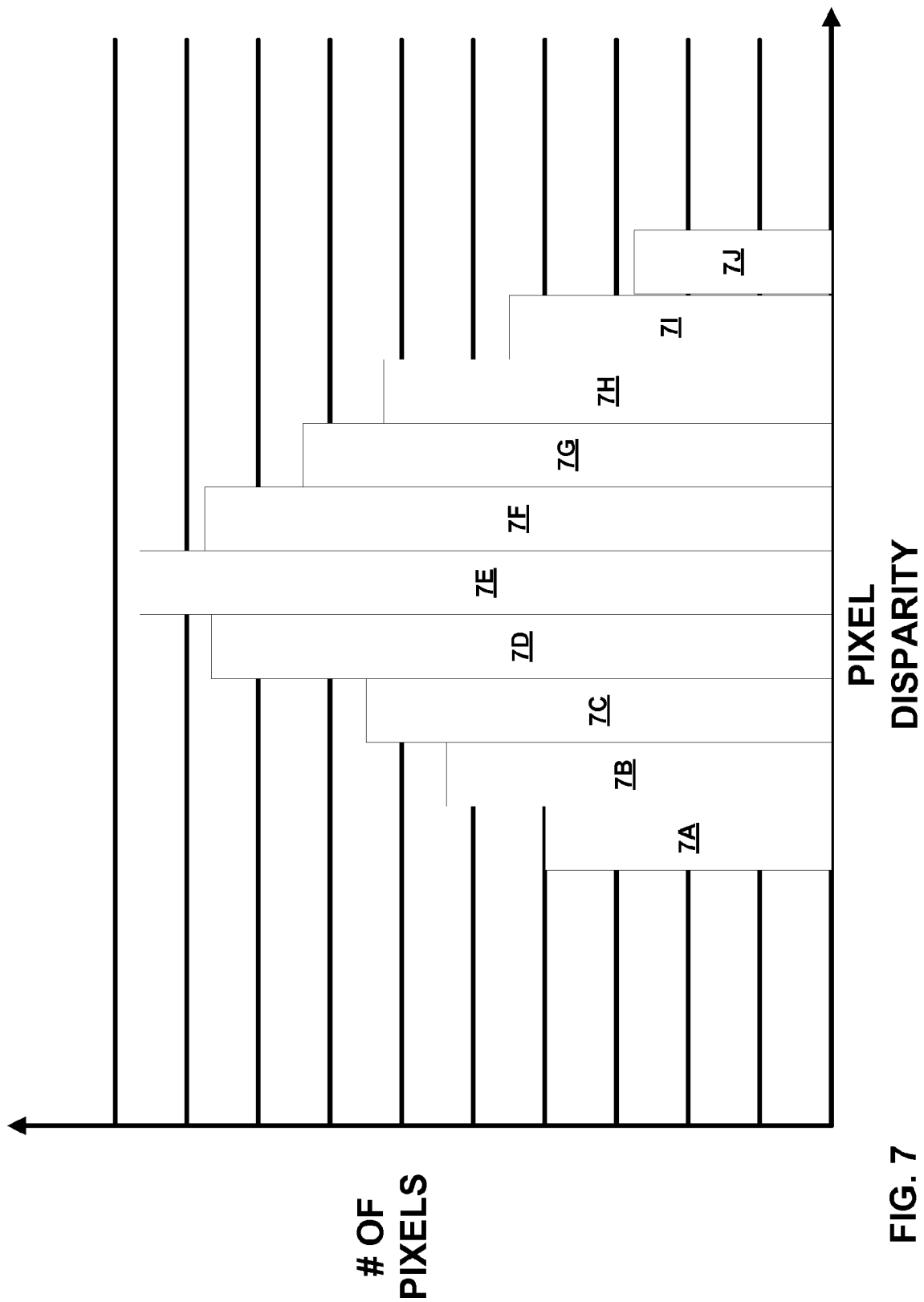
FIG. 7 is a conceptual diagram that illustrates one example of a histogram that may be generated to determine a typical disparity of pixels of an ROI consistent with the techniques of this disclosure.

FIG. 7 is a conceptual diagram that illustrates one example of a histogram that may be generated by image processing module 120 to determine a typical disparity of an ROI as described above with respect to FIG. 6 at step 603. As shown in the example of FIG. 7, image processing module 120 (e.g., disparity module 222) may determine disparity for pixels of an ROI, and assign each pixel of the ROI to one of a plurality of bins 7A-7J. Ten bins are shown in the example of FIG. 7, however any number of bins could be used in different examples. As shown on the X-axis of the FIG. 7 histogram, bins 7A-7J may each represent a different range of disparity for pixels of the ROI. For exemplary purposes only, if disparity is determined based on a scale of 1-100, with 1 being a smallest amount of disparity, and 100 being a largest amount of disparity, then bin 7A may represent a disparity range of 1-10, bin 7B may represent a disparity range of 11-20, bin 7C may represent a disparity range of 21-30, and so on ... bin 7J may represent a disparity range of 91-100.

As shown on the Y axis of the FIG. 7 histogram, one or more pixels may be assigned one or more of bins 7A-7J. As shown in the example of FIG. 7, bin 7J has been assigned a smallest number of pixels, while bin 7E has been assigned a largest number of pixels. According to one example, image processing module 120 may determine a typical disparity of an ROI based on selection of one of a plurality of bins 7A-7J that has been assigned a largest number of pixels. According to the example of FIG. 7, bin 7E has been assigned a greatest number of pixels relative to bins 7A-7D and 7F-7J. Accordingly a disparity range of bin 7E, or a disparity of the range of bin 7E, may be used as a typical disparity to determine a ZDP for the display of stereoscopic images, as described above with respect to FIG. 6.

According to another example, a histogram as depicted in FIG. 7 may be considered similar to a Gaussian distribution. According to this example, image processing module 120 may use a mean of the Gaussian distribution (e.g., an average) as a typical disparity to determine a ZDP for the display of stereoscopic images as described above with respect to FIG. 6.

Figure 8:
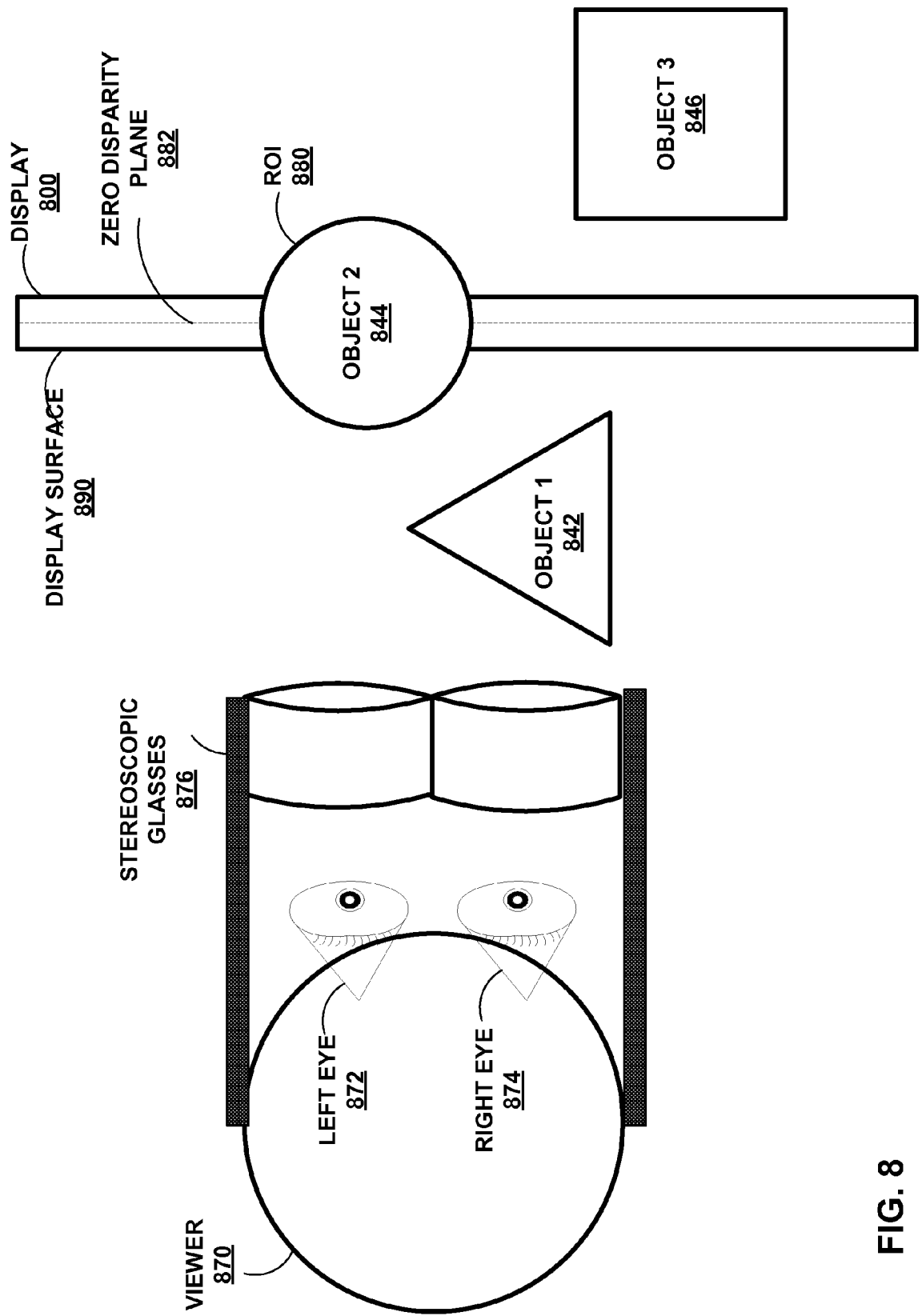
FIGS. 8-10 are conceptual diagrams that illustrates the display of a three-dimensional presentation with a ZDP determined based on an ROI of captured images consistent with the techniques of this disclosure.
Figure 9:
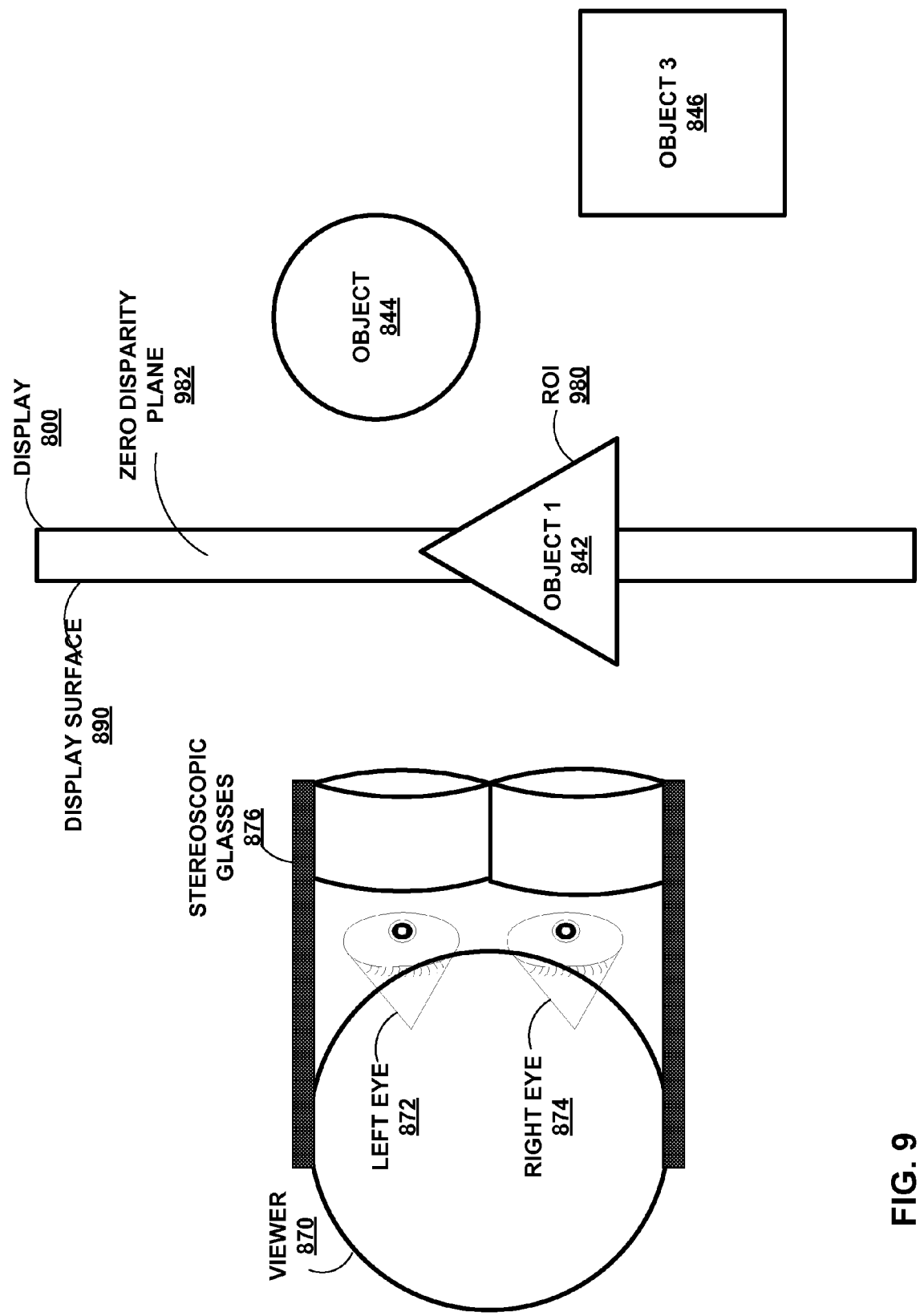
Figure 10:
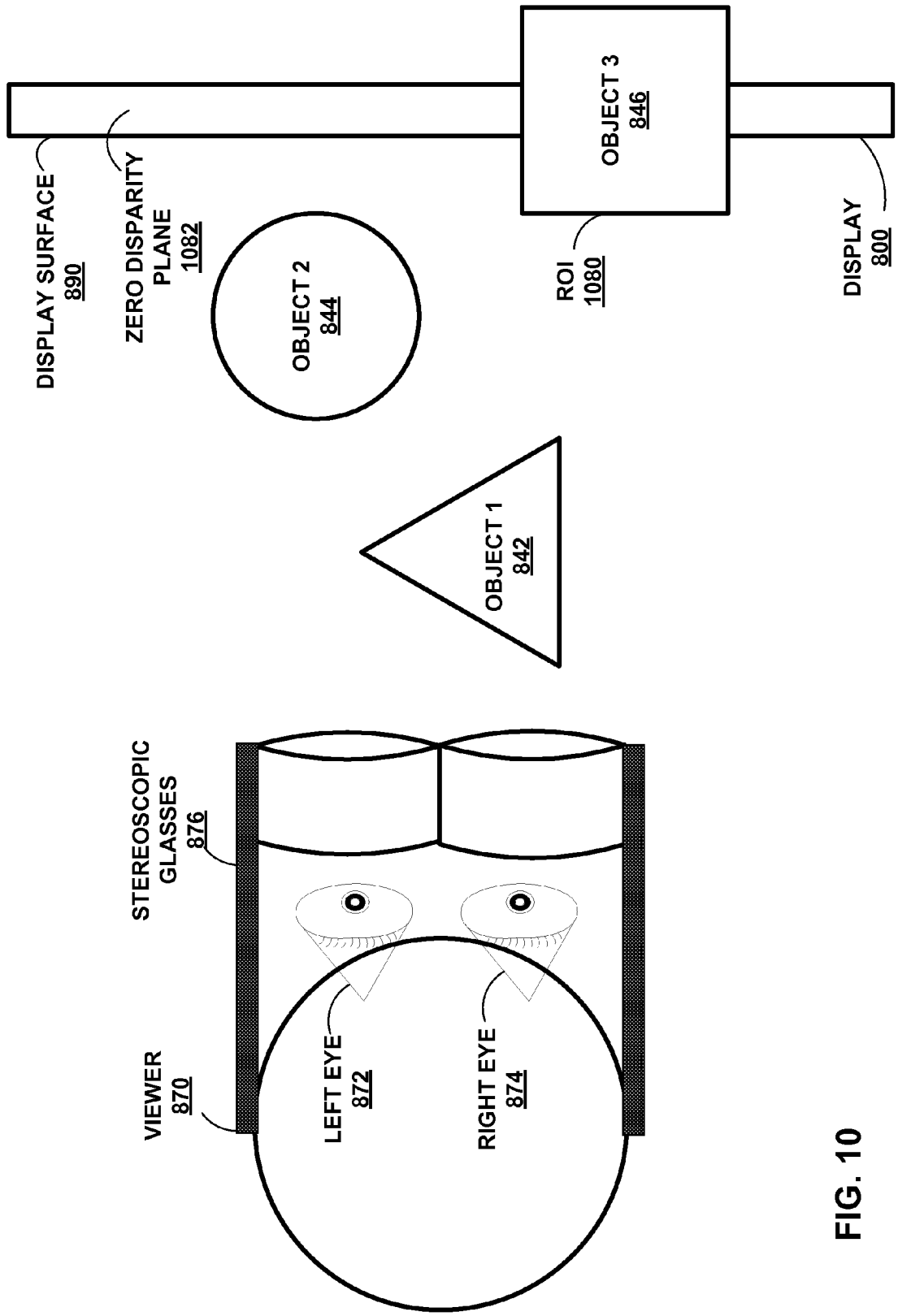

FIG. 8-10 are conceptual diagrams that illustrate various examples of the display of a stereoscopic video presentation to a viewer 870 with a ZDP determined based on an identified ROI as described above with respect to FIG. 6. As shown in FIGS. 8-10, a viewer 870 (e.g., a human viewer), has right 872 and left 874 eyes. In the examples of FIGS. 8-10, viewer 870 is viewing a stereoscopic display 800. The stereoscopic display 800 may be controlled by display control module 132 to present to viewer 870 a first image to be perceived by left eye 872, and a second image to be perceived by right eye 874. In some examples, as also shown in FIGS. 8-10, viewer 870 may wear stereoscopic glasses 876, or another device, configured to cause the first image to be perceived by the viewer's left eye 872, and the second image to be perceived by the viewer's right eye 874. For example, stereoscopic glasses 876 may be liquid crystal shutter glasses (LC shutter glasses) or active shutter glasses. According to these examples, stereoscopic glasses 876 may include respective right and left lenses that each contain a liquid crystal layer that may become dark when voltage is applied to the liquid crystal layer, otherwise, the lens is transparent. The respective right and left lenses of stereoscopic glasses 876 may be configured to transition between dark and transparent consistent with a rate at which display 800 transitions between presentation of respective right and left images (e.g., synchronized via wireless communication such as Bluetooth®, infrared, Wi-fi®, or other form of wireless communication). Accordingly, respective right and left images may be displayed solely to the viewer's left 872 and right 874 eyes to cause the user to perceive displayed images three dimensionally.

Stereoscopic glasses 876 may instead comprise anaglyph glasses, ChromaDepth glasses, or polarized 3D glasses, or any other device or structure that allows different views to be perceived by a viewer's left 872 and right 874 eyes. Stereoscopic glasses 876 may be configured to cause different views to perceived via any type of filtering, e.g., optical wavelength, polarization, or other technique. As another example, instead of stereoscopic glasses 876, specialized contact lenses or other optical structures may be used to cause different views to be perceived by a viewer's left 872 and right 874 eyes.

Stereoscopic glasses 876 depicted in FIGS. 8-10 are provided for exemplary purposes only, and intended to be non-limiting. In other examples, display 800 may be an auto-stereoscopic display configured to present respective right and left images to a viewer's right and left eyes, respectively, without the use of stereoscopic glasses 876. For example, display 800 may employ parallax barrier (a layer of material with a series of precision slits, allowing each eye to see a different set of pixels), lenticular (array of magnifying lenses designed such that when viewed from slightly different angles, different images are magnified), volumetric (create 3-D imagery via the emission, scattering, or relaying of illumination from well-defined regions in (x,y,z) space, e.g., including electro-holographic and light field), and/or any combination of these techniques to auto-stereoscopically present images to a user with a ZDP determined based on an identified ROI consistent with the techniques of this disclosure.

The examples illustrated in FIGS. 8-10 depict the stereoscopic display of the image objects 842, 844, and 846, as they would be perceived by a viewer relative to a display surface 890 of display 800. The image objects depicted in FIGS. 8-10 generally correspond to objects 342, 344, and 346 of a scene captured by first and second image capture elements 312, 314 depicted in FIG. 3 and described above.

FIG. 8 is a conceptual diagram that illustrates one example of stereoscopic display of a 3D image presented with a ZDP determined based on ROI of captured video consistent with the techniques of this disclosure. As shown in FIG. 8, image processing module 120 (e.g., ROI identification module 224) has identified object 844 as an ROI 880 of the captured images. Image processing module 120 may identify object 844 as an ROI 880 automatically or manually. For example, as described above, image processing module 120 may automatically identify object 844 as an ROI according to the various techniques described herein. According to other examples, image processing module 120 may identify object 844 as an ROI 880 based the receipt of user input indicating selection of object 844 as an ROI 880.

As also shown in FIG. 8, image processing module 120 may, based on identification of object 844 as ROI 880, process (e.g., align, crop, and/or otherwise process) captured images to be stereoscopically displayed with a ZDP determined based on identified ROI 880. A ZDP may be described as a plane of a displayed 3D image for which image objects appear substantially two-dimensional (2D) to a viewer, e.g., image objects that appear substantially at or near a display surface 890. Objects of a ZDP may have little or no difference (e.g., little or no disparity), between respective right and left views of the image. A 3D image may also comprise other image objects not of the ZDP, e.g., images that appear in front of or behind the display surface due to differences (disparity) between respective right and left images. When viewing a 3D image, objects may appear to extend outwardly from, or fall behind, a ZDP of the 3D image. Display surface 890 may be a surface of a display device, such as an LCD or plasma display. Display surface 890 may instead be a surface upon which images are projected, such as a wall or other surface upon which a projector device projects images.

As described above, to cause a displayed image to be perceived as three-dimensional to a user, image processing module 120 may process images for display such that slightly different images (views) are directed to a viewer's left and right eyes 872, 874, respectively. A difference between the respective right and left images may cause one or more objects of the displayed images to appear in front of, or behind, a surface of display 800. Consistent with the techniques of this disclosure, image processing module 120 may determine a ZDP 882 of a displayed stereoscopic image such that objects of an ROI 880 (e.g. object 844 in FIG. 8) may be presented with little or no difference (disparity) between respective left 872 and right 874 views, and thereby appear at or near display surface 890. On the other hand, as also shown in FIG. 8, object 842 is displayed such that it is perceived by viewer 870 as substantially in front of display surface 890, and object 846 is displayed such that it is perceived by viewer 870 as substantially behind display 800. Objects 842 and 846 may appear in front of or behind display surface due to respective differences between displayed right and left images.

FIGS. 9 and 10 are conceptual diagrams that illustrate other examples of stereoscopic display of a 3D image presented with a ZDP 982 selected based on based on an ROI 980 of captured video consistent with the techniques of this disclosure. As shown in FIG. 9, image processing module 120 causes, based on identification of ROI 980, object 842 to be displayed such that it appears at or near display surface 890, e.g., at or near ZDP 982 instead of object 844 as shown in FIG. 8. As also shown in FIG. 9, image processing module 120 causes object 844 to appear behind ZDP 982, and object 846 to appear further behind ZDP 982. According to the example of FIG. 10, image processing module 120 identifies object 846 as an ROI 1080 of captured images. Accordingly, image processing module processes captured images such that object 846 appears at or near ZDP 1082.

According to some examples, a VT device 101A, 101B as depicted in FIG. 1, or an HMI device 101C depicted in FIG. 1B, may be configured to automatically transition a ZDP of displayed images based on a change in identified ROI 880, of capture images. For example, image processing module 120 may identify (e.g., automatically or based on receipt of user input) a first ROI of captured images (e.g., ROI 880 in FIG. 8, including object 844). Image processing module 120 may further identify a second ROI (e.g., ROI 980 in FIG. 9, including object 842). Accordingly, image processing module 120 may automatically modify display of 3D images such that one or more objects of the second ROI (e.g., ROI 980) appear at or near a second ZDP of the displayed images (e.g., appear at or near display surface 880).

For example, a first user may, via first VT device 101A as illustrated in FIG. 1, view images of a second user captured via a second VT device 101B. Assuming object 844 is the second user, image processing module 120 of one of the first or second VT devices 101A, 101B may identify (e.g., automatically or by receipt of user input), object 844 as an ROI 880. Accordingly, the first VT device 101A may present images displayed to the first user such that object 844 (e.g., the second user's face) appears at or near ZDP 882, as shown in the example of FIG. 8.

The second user may hold a photo or other object in front of him/herself. Image processing module 120 may identify the held out photo (e.g., object 842) as a second ROI 980. Image processing module 120 may identify the photo automatically, e.g., by automatically determining that object 842 has become closer to image capture elements 112, 114, or the second VT device 101B may receive input from the second user that the second user desires identify the photo as an ROI. Accordingly, image processing module 120 (and/or display module 132) may cause images to be displayed to the user such that the photo appears with little or no disparity (e.g., at or near ZDP 982), as displayed in FIG. 9.

Figure 11:
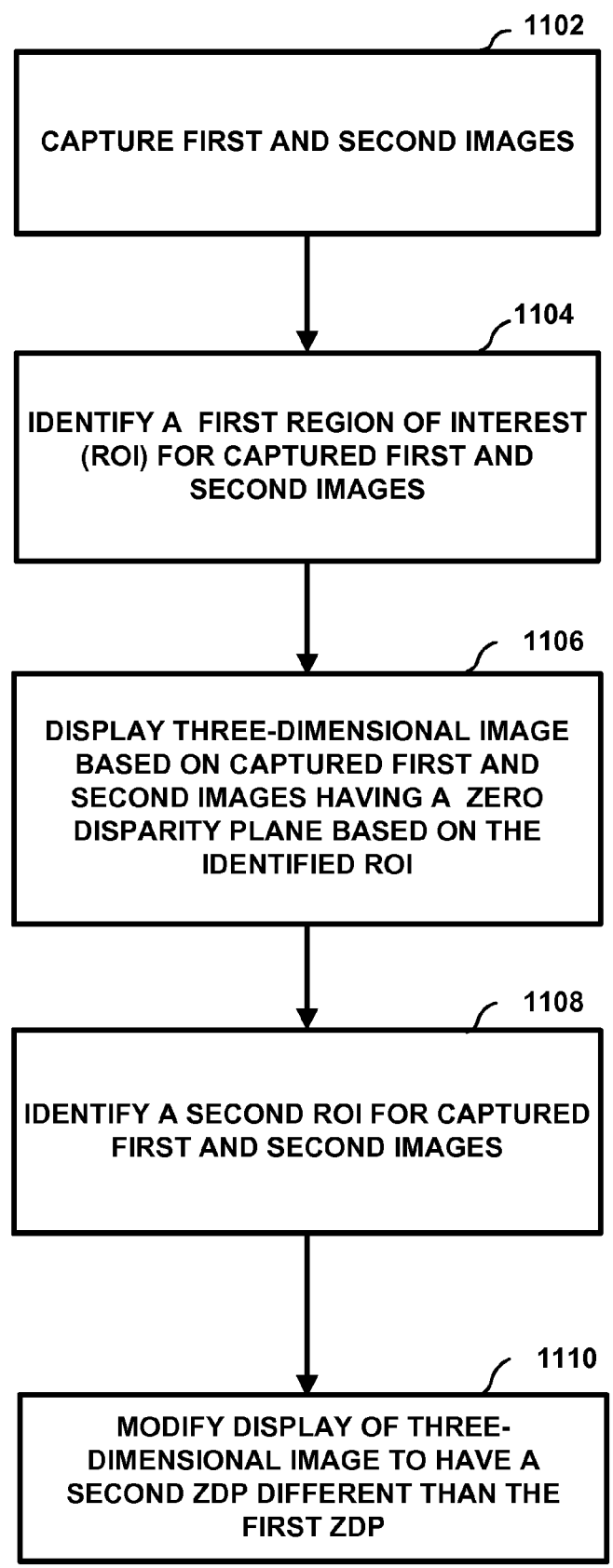
FIG. 11 is a flow chart that illustrates one example of a method for displaying three-dimensional feedback-based images consistent with the techniques of this disclosure.

FIG. 11 is a flow chart that illustrates one example of a method of automatically modifying the stereoscopic display of captured images based on a change in an identified ROI of the captured images. As shown in FIG. 11, an image capture module may capture first and second images, e.g., using at least two stereoscopic cameras 112, 114 (1102). Image processing module 120 may further identify a first ROI of the captured images (1104). Image processing module 120 may identify the first ROI automatically or via receipt of user input. Image processing module 120 may further process (e.g., align, crop, or otherwise process) the first and second images for display with a zero disparity plane (ZDP) selected based on the identified first ROI (1106). For example, image processing module 120 may process the first and second images such that one or more objects of the first ROI appear at or near a display surface 890.

Image processing module 120 may further identify a second ROI for the first and second captured images (1108). Image processing module may automatically identify the second ROI, or may receive user input identifying the second ROI. Image processing module 120 may further modify the captured first and second images for display with second ZDP based on the second identified ROI (1110). For example, image processing module 120 may process the first and second captured images such that one or more objects of the second ROI appear at or near a display surface 890. Image processing module 120 may further process the first and second captured images such that one or more objects of the first identified ROI no longer appear at or near the display surface 890.

Figure 12:
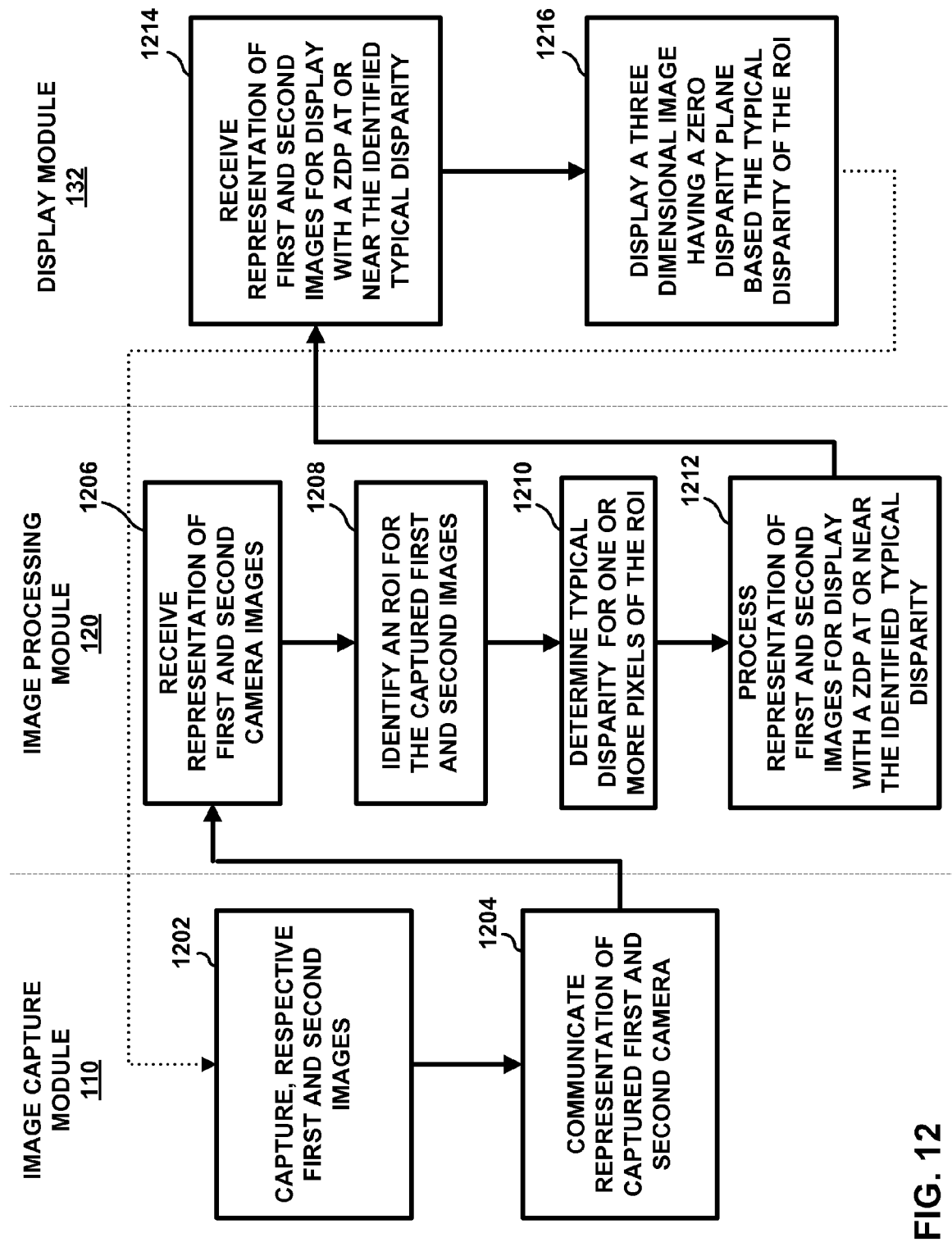
FIG. 12 is a flow chart that illustrates one example of a method for displaying three-dimensional feedback-based images consistent with the techniques of this disclosure.

FIG. 12 is a flow diagram that illustrates one example of a method of determining a ZDP for display of one or more captured images based on an ROI of the captured images consistent with this disclosure. For exemplary purposes, FIG. 12 depicts various operations performed by respective components of one or more VT devices 101A, 102B, and/or one or more HMI devices 101C as illustrated in FIGS. 1A and 1B consistent with the techniques of this disclosure. The example of FIG. 12 is provided for exemplary purposes only, and is intended to be non-limiting. Any component of VT or HMI devices 101 may perform the operations depicted in FIG. 12.

As shown in FIG. 12, an image capture module 110 of a VT or HMI device 101 may be configured to capture respective first and second images of a scene (1202). For example, image capture module 110 may be configured to control one or more image capture elements 112, 114 to capture the respective first and second images. According to other examples, image capture module 110 may control a single image capture element configured to capture multiple views of a scene, e.g., a plenoptic camera.

Image capture module 110 may further communicate a representation of captured first and second images (1204). For example, image capture module 110 may communicate an electronic representation that may be readable by one or more processors, DSP, or other computing component. According to the example of FIG. 12, image capture module 110 may communicate a representation of captured first and second images to an image processing module 120 for processing. For example, where device 101 is a VT device 101A, image capture module 110A may communicate a representation of captured first and second images to an image processing module 120B of a second VT device 101B for processing. According to other examples, image capture module 110A may communicate a representation of captured first and second images to image processing module 120A of first VT device 101A. Once image processing module 120A has processed the captured first and second images, image processing module 120A may communicate a representation of the processed first and second images to second VT device 101B, for further processing, display, and/or storage. According to another example, where device 101 is an HMI device 101C, image capture module 110C may communicate captured images to image processing module 101C local to HMI device 101C, for processing, storage, and/or display.

Image processing module 120 may receive, from image capture module 110, the representation of one or more captured first and second images (1206). Image processing module 120 may be configured to process the received images for storage, communication, and/or display. For example, image processing module 120 may be configured to receive the representation of first and second captured images for purposes of creating a multi-view representation that may be stereoscopically displayed to appear substantially three-dimensional to a user.

To display a stereoscopic image, it may be desirable to define a zero disparity plane (ZDP) of the image. A ZDP may be described as a plane of a displayed 3D image for which image objects appear substantially two-dimensional (2D) to a viewer, e.g., image objects that appear substantially at or near a display surface 890. Objects of a ZDP may have little or no difference (e.g., little or no disparity), between respective right and left views of the image. A 3D image may also comprise other image objects not of the ZDP, e.g., images that appear in front of or behind the display surface due to differences (disparity) between respective right and left images. When viewing a 3D image, objects may appear to extend outwardly from, or fall behind, a ZDP of the 3D image.

Image processing module 120 may be configured to determine a ZDP for presentation of 3D images based on an identified ROI of captured images. For example, as shown in FIG. 12, image processing module 120 (e.g., ROI identification module 224) may identify an ROI for the first and second images received from image capture module at step 1206 (1208). Image processing module 120 may identify an ROI automatically (e.g., based on image pixel disparity determined by disparity module 222 as described above with respect to FIG. 5, or other techniques described herein), or based on receipt of user input identifying an ROI.

Image processing module 120 may further determine a typical disparity for one or more pixels of the ROI (1210). For example, image processing module 120 may determine a typical disparity based on one or more indications of pixel disparity received from disparity module 222 illustrated in FIG. 2.

Image processing module 120 may further process the received representations of captured images (received at step 120) to generate one or more representations of the captured images suitable for 3D display (1212). For example, image processing module 120 may generate respective right or left views that are constructed to allow for displayed images to appear substantially three-dimensional to a viewer. According to one such example, image processing module 120 may generate one or more other representations of captured images such that a ZDP of the displayed images is arranged at a depth based on the typical disparity determined at step 1210. Generating the one or more 3D representations may include cropping, aligning, and/or otherwise processing respective right and left views (e.g., captured images), such that a ZDP of the displayed images is arranged at a depth based on the typical disparity determined at step 1210.

As also shown in FIG. 12, image processing module 120 may communicate a generated representation of a 3D presentation to one or more display modules 132 for display to a user. In the example where device 101 is a VT device 101A, image processing module may communicate a 3D presentation to another VT device 101B for display. For example, image processing module 120 may communicate an entire representation of the 3D presentation. According to another example, image processing module 120 may communicate a representation via streaming techniques, e.g., HTTP streaming. In the example where device 101 is an HMI device 101C, image processing module 120 may communicate a 3D presentation to a display control module 132C local to HMI device 101C. For example, image processing module 120C may store the 3D representation in a storage component of HMI device 101C (e.g., random access memory, hard-drive, Flash memory). Display control module 132C may then access the stored 3D representation, and control one or more displays to present the 3D representation to a viewer. According to another example, image processing module 120C may communicate the 3D representation directly to display control module 132C, e.g., via a system bus or other inter-device communications mechanism.

As also shown in FIG. 12, display module 132 may receive the processed 3D representation of the first and second image for display with a ZDP at or near the identified typical disparity (1214). Display module 132 may control one or more stereoscopic displays to present the three-dimensional image having a ZDP based on the typical disparity of the ROI determined by image processing module 120 at step 1210 (1216).

According to one example, as indicated by the dashed line in FIG. 12, a VT and/or HMI device 101 may be configured to continually capture respective first and second images, identify an ROI of the captured images, and generate one or more 3D presentations of captured images for display with a ZDP based on the identified ROI. Accordingly, the techniques of this disclosure may be used for feedback-based video applications such as VT or HMI, where images of a subject are continuously captured and displayed to a user in real or close to real-time, with a ZDP based on one or more identified ROI consistent with the techniques of this disclosure.

Figure 13:
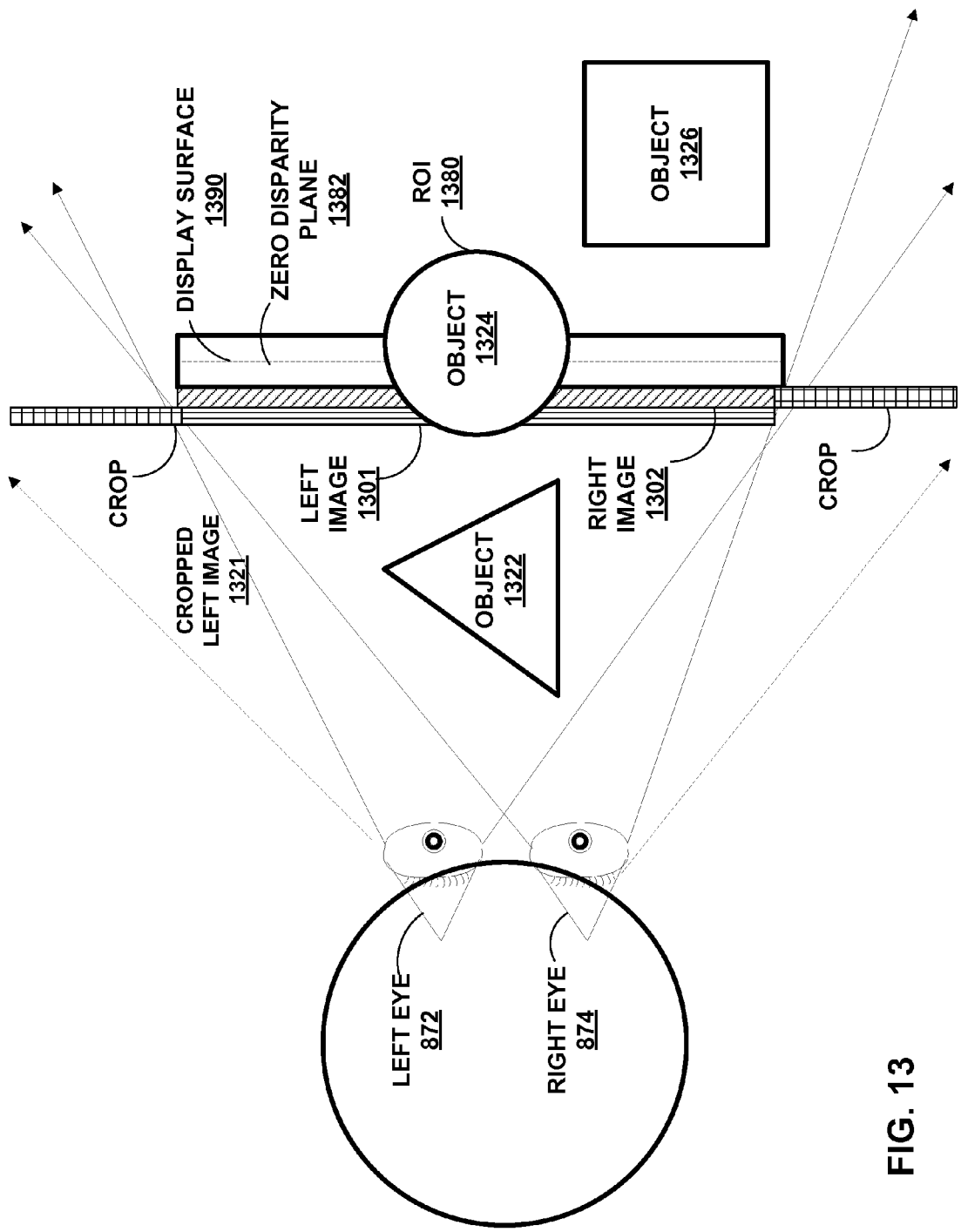
FIG. 13 is a conceptual diagram that illustrates one example of processing captured images to generate a three-dimensional presentation consistent with the techniques of this disclosure.

FIG. 13 is a conceptual diagram that illustrates one example of a technique of processing first and second captured images for presentation of a 3D image consistent with the techniques of this disclosure. As shown in FIG. 13, an image processing module 120 may receive a representation of first and second captured images (captured left image 1301, captured right image 1302, respectively). As described herein, image processing module 120 may process the representation of left and right captured images for three-dimensional presentation. For example, image processing module 120 may process the representation of captured left and right images 1301, 1302 such that the left and right images 1301, 1302 may be presented with a ZDP determined according to an identified ROI in the captured images. For example, image processing module 120 may align, crop, or otherwise process the representation of captured left and right images 1301, 1302 with respect to one another, such that one or more objects of an identified ROI appear with little or no disparity when displayed.

For example, as shown in the example of FIG. 13, image processing module 120 may arrange, align, or otherwise position respective left 1301 and right 1302 images such that ROI 1380 (e.g., comprising object 1324), appears at or near display surface 1390. For example, to make object 1324 appear at or near display surface 1390, the respective first and second images may be aligned with one another such that, when viewed by a viewer, little or no difference appears between the first and second images for object 1324. Accordingly, object 1324 may appear at or near display surface 1390. At the same time, objects 1322 may appear in front of display surface 1390, and object 1326 may appear behind display surface 1390.

As also shown in FIG. 13, image processing module 120 may crop each of right and left images 1301, 1302. For example, as shown in FIG. 13, when the respective right and left images 1301, 1302 are aligned as described above, portions of the right and left images may extend past a display area of a display or other surface 1390 upon which the images are presented. Accordingly, image processing module 120 may operate to remove respective portions (crop) of the first and second images 1301, 1302, such that only those portions within the display area are presented. As shown in FIG. 13, a portion of each the left and right images has been cropped, to create a cropped right image, and a cropped left image 1321.

The conceptual example depicted in FIG. 13 is merely one example of cropping and alignment that may be performed by image processing module 120 in order to generate a 3D presentation of captured images with a ZDP 1382 determined based on an ROI 1380 of the captured images. The example of FIG. 13 is merely one example of processing that may be performed to prepare a 3D presentation. Other processing steps may also be performed by image processing module 120 in order to prepare a 3D presentation consistent with the techniques of this disclosure.

A number of examples have been described. In one or more of these examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples been described. These and other examples are within the scope of the following claims.

The invention claimed is:

1. A method of processing stereoscopic image data comprising:
   acquiring at least two stereoscopically captured images;
   identifying a region of interest (ROI) of the acquired at least two images, wherein the ROI represents a portion of each of the acquired at least two images but does not represent an entirety of either of the acquired at least two images;
   determining a pixel disparity between the acquired at least two images, wherein the pixel disparity is associated with representations of the ROI in each acquired image of the acquired at least two images, wherein the pixel disparity is based at least in part on color transitions between corresponding pixels, and wherein determining the pixel disparity comprises creating a histogram to represent an ROI pixel disparity between the representations of the ROI in each acquired image of the acquired at least two images, such that the histogram includes individual pixel disparity values concentrated at or near a mean pixel disparity value;
   identifying a zero disparity plane (ZDP) for three-dimensional (3D) presentation of the acquired at least two images; and
   adjusting the ZDP to coincide with the mean pixel disparity value included in the histogram, such that at least a portion of the ROI is displayed at or near the ZDP.

2. The method of claim 1, wherein identifying the ROI of the acquired at least two images comprises:
   receiving user input identifying the ROI.

3. The method of claim 1, wherein identifying the ROI of the acquired at least two images comprises:
   automatically identifying the ROI.

4. The method of claim 3, wherein automatically identifying the ROI comprises
   automatically identifying the ROI based on at least one individual pixel disparity value of the individual pixel disparity values included in the histogram.

5. The method of claim 3, wherein automatically identifying the ROI comprises automatically identifying based on one or more techniques selected from a group consisting of:
   motion detection;
   optical flow;
   facial recognition;
   object recognition;
   color histogram; and
   blurriness.

6. The method of claim 1, wherein determining the pixel disparity further comprises determining a typical disparity of the identified ROI.

7. The method of claim 1 further comprising
   displaying the 3D presentation such that at least one object of the identified ROI appears at or near a display surface.

8. The method of claim 1,
   wherein the ROI is a first ROI,
   wherein the mean pixel disparity value is a first mean disparity value associated with the first ROI, and
   wherein the ZDP is a first ZDP,
   the method further comprising:
   identifying a second ROI of the acquired at least two images; and
   adjusting the first ZDP to form a second ZDP for 3D presentation of the acquired at least two images to coincide with a second mean pixel disparity associated with the second ROI, such that at least a portion of the second ROI is displayed at or near the second ZDP.

9. The method of claim 1, wherein identifying the ZDP for 3D presentation of the acquired at least two images comprises aligning and/or cropping one or more of the acquired at least two images.

10. An apparatus for processing stereoscopic image data, the apparatus comprising:
    one or more processors;
    an image capture module configured to acquire at least two images at least in part by causing at least one image capture device to stereoscopically capture the at least two images, wherein the ROI represents a portion of each of the acquired at least two images but does not represent an entirety of either of the acquired at least two images;
    a region of interest (ROI) identification module configured to identify an ROI of the acquired at least two images;
    a disparity module configured to determine a pixel disparity between the acquired at least two images, wherein the pixel disparity is associated with representations of the ROI in each acquired image of the acquired at least two images, wherein the pixel disparity is based at least in part on color transitions between corresponding pixels, and wherein the disparity module determines the pixel disparity at least in part by creating a histogram to represent an ROI pixel disparity between the representations of the ROI in each acquired image of the acquired at least two images, such that the histogram includes individual pixel disparity values concentrated at or near a mean pixel disparity value;
    a zero disparity plane (ZDP) identification module configured to identify a ZDP for a three-dimensional (3D) display of the acquired at least two images; and
    a ZDP adjustment module configured to adjust the ZDP to coincide with the mean pixel disparity value included in the histogram, such that at least a portion of the ROI is displayed at or near the ZDP.

11. The apparatus of claim 10, wherein the ROI identification module is configured to identify the ROI based on receipt of user input identifying the ROI.

12. The apparatus of claim 10, wherein, to identify the ROI of the acquired at least two images, the ROI identification module is configured to automatically identify the ROI.

13. The apparatus of claim 12
    wherein, to automatically identify the ROI, the ROI identification module is configured to automatically identify the ROI of the acquired at least two images at least one individual pixel disparity value of the individual pixel disparity values included in the histogram.

14. The apparatus of claim 12, wherein the ROI identification module is configured to identify an ROI of the acquired at least two images based on one or more techniques selected from a group consisting of:
    motion detection;
    optical flow;
    facial recognition;
    object recognition;
    color histogram; and
    blurriness.

15. The apparatus of claim 10,
wherein, to determine the pixel disparity, the pixel disparity module is configured to determine a typical disparity of the identified ROI, and
wherein, to identify the ZDP, the ZDP identification module is configured to identify the ZDP based at least in part on the determined typical disparity.

16. The apparatus of claim 10, wherein the ZDP determination module is configured to determine the ZDP for 3D presentation of the acquired at least two images such that at least one object of the identified ROI appears at or near a display surface.

17. The apparatus of claim 10,
wherein the ROI is a first ROI,
wherein the mean pixel disparity value is a first mean pixel disparity value associated with the first ROI,
wherein the ZDP is a first ZDP,
wherein the ROI determination module is further configured to identify a second ROI of the acquired at least two images, and
wherein the ZDP adjustment module is configured to adjust the first ZDP to form a second ZDP for 3D presentation of the acquired at least two images to coincide with a second mean pixel disparity value associated with the second ROI, such that at least a portion of the second ROI is displayed at or near the second ZDP.

18. The apparatus of claim 10, wherein the ZDP identification module is configured to determine the ZDP for 3D presentation of the acquired at least two images by aligning and/or cropping the acquired at least two images.

19. The apparatus of claim 10, wherein the apparatus is a wireless device.

20. The apparatus of claim 10, wherein the apparatus is a video telephony device or human machine interface device.

21. A non-transitory computer-readable storage medium comprising instructions that upon execution cause one or more processors to:
receive at least two stereoscopically captured images, wherein the ROI represents a portion of each of the acquired at least two images but does not represent an entirety of either of the received at least two images;
identify a region of interest (ROI) of the received at least two images; and
determine a pixel disparity between the received at least two images, wherein the pixel disparity is associated with representations of the ROI in each acquired image of the acquired at least two images, wherein the pixel disparity is based at least in part on color transitions between corresponding pixels, and wherein determining the pixel disparity comprises creating a histogram to represent an ROI pixel disparity between representations of the ROI in each received image of the received at least two images, such that the histogram includes individual pixel disparity values concentrated at or near a mean pixel disparity value;
identify a zero disparity plane (ZDP) for three-dimensional (3D) presentation of the received at least two images; and
adjust the ZDP to coincide with the mean pixel disparity value included in the histogram, such that at least a portion of the ROI is displayed at or near the ZDP.

22. The non-transitory computer-readable storage medium of claim 21, wherein the instructions that cause the one or more processors to identify the ROI of the received at least two images comprise instructions that, upon execution, cause the one or more processors to:
identify the ROI of the received at least two images based on received user input identifying the ROI.

23. The non-transitory computer-readable storage medium of claim 21, wherein the instructions that cause the one or more processors to identify the ROI of the received at least two images comprise instructions that, upon execution, cause the one or more processors to:
automatically identify the ROI of the received at least two images.

24. The non-transitory computer-readable storage medium of claim 23, wherein the instructions that cause the one or more processors to automatically identify the ROI comprise instructions that, upon execution, cause the one or more processors to:
automatically identify the ROI based on the determined disparity of the at least one pixel.

25. The non-transitory computer-readable storage medium of claim 23, wherein the instructions that cause the to automatically identify the ROI comprise techniques that are based on one or more techniques selected from a group consisting of:
motion detection;
optical flow;
facial recognition;
object recognition;
color histogram; and
blurriness.

26. The non-transitory computer-readable storage medium of claim 21, further encoded with instructions that, upon execution, cause the one or more processors to:
determine a typical disparity of the identified ROI.

27. The non-transitory computer-readable storage medium of claim 26, wherein the instructions cause the computing device to:
determine the ZDP such that at least one object of the identified ROI appears at or near a display surface.

28. The non-transitory computer-readable storage medium of claim 21, wherein the ROI is a first ROI, and wherein the ZDP is a first ZDP, and wherein the instructions further cause the computing device to:
identify a second ROI of the received at least two images; and
adjust the first ZDP to form a second ZDP for 3D presentation of the received at least two images based on the identified second ROI, such that at least a portion of the second ROI is displayed at or near the second ZDP.

29. The non-transitory computer-readable storage medium of claim 21, wherein the instructions further cause the computing device to:
align and/or crop the received at least two images.

30. A device for processing stereoscopic image data, comprising:
means for receiving at least two stereoscopically captured images, wherein the ROI represents a portion of each of the acquired at least two images but does not represent an entirety of either of the received at least two images;
means for identifying a region of interest (ROI) of the received at least two images;
means for determining a pixel disparity between the received at least two images, wherein the pixel disparity is associated with representations of the ROI as represented in each acquired image of the acquired at least two images, wherein the pixel disparity is based at least in part on color transitions between corresponding pixels, and including means to generate a histogram to represent an ROI pixel disparity between the representations of the ROI in each received image of the received at least two images, such that the histogram includes individual pixel disparity values concentrated at or near a mean pixel disparity value;
means for identifying a zero disparity plane (ZDP) for three-dimensional (3D) presentation of the received at least two images; and means for adjusting the ZDP to coincide with the mean pixel disparity value included in the histogram, such that at least a portion of the ROI is displayed at or near the ZDP.

31. The device of claim 30, wherein the means for identifying the ROI of the received at least two images identify the ROI based on receipt of user input identifying the ROI.

32. The device of claim 30, wherein the means for identifying the ROI automatically identify the ROI of the received at least two images.

33. The device of claim 30, further comprising:
means for determining disparity of at least one pixel of the at least two images,
wherein the means for identifying the ROI of the received at least two images automatically identify the ROI based on the determined disparity of the at least one pixel.

34. The device of claim 30, wherein the means for identifying the ROI of the received at least two images automatically identify the ROI based on one or more techniques selected from a group consisting of:
motion detection;
optical flow;
facial recognition;
object recognition;
color histogram; and
blurriness.

35. The device of claim 30, further comprising:
means for determining disparity of at least one pixel of the identified ROI; and
means for determining a typical disparity of the identified ROI based on the determined disparity of the at least one pixel of the identified ROI.

36. The device of claim 30, wherein the means for determining the ZDP comprises means for determining the ZDP such that at least one object of the identified ROI appears at or near a display surface.

37. The device of claim 30, wherein the ROI is a first ROI, and wherein the ZDP is a first ZDP, and wherein the means for identifying the ROI further identify a second ROI of the acquired at least two images, and
wherein the means for determining the ZDP include means to adjust the first ZDP to form a second ZDP for 3D presentation of the received at least two images based on the identified second ROI.

38. The device of claim 30, further comprising:
means for aligning and/or cropping the acquired at least two images.

39. The method of claim 1, wherein the histogram represents a Gaussian distribution of the individual pixel disparity values.

40. The method of claim 6, wherein determining the typical disparity of the identified ROI comprises determining that the typical disparity coincides with the mean pixel disparity value of the histogram.

* * * * *